United States Patent [19]

Mercurio et al.

[11] 4,024,503
[45] May 17, 1977

[54] PRIORITY INTERRUPT HANDLING SYSTEM

[75] Inventors: Luigi Mercurio, Milan; Guido Badagnani, Segrate (Milan), both of Italy

[73] Assignee: Ing. C. Olivetti & C., S.p.A., Ivrea (Turin), Italy

[22] Filed: Mar. 26, 1974

[21] Appl. No.: 454,973

Related U.S. Application Data

[63] Continuation-in-part of Ser. No. 92,777, Nov. 25, 1970, abandoned.

[30] Foreign Application Priority Data

Nov. 25, 1969 Italy .............................. 54152/69
Sept. 25, 1970 Italy .............................. 70229/70

[52] U.S. Cl. .............................................. 340/172.5
[51] Int. Cl.² ........................ G06F 9/16; G06F 9/18
[58] Field of Search ............................... 340/172.5

[56] References Cited

UNITED STATES PATENTS

| | | | |
|---|---|---|---|
| 3,229,253 | 1/1966 | Logue | 340/172.5 |
| 3,248,708 | 4/1966 | Haynes | 340/172.5 |
| 3,258,748 | 6/1966 | Schneberger et al. | 340/172.5 |
| 3,373,407 | 3/1968 | Ling | 340/172.5 |
| 3,399,384 | 8/1968 | Crockett et al. | 340/172.5 |
| 3,426,328 | 2/1969 | Gunderson et al. | 340/172.5 |
| 3,453,600 | 7/1969 | Stafford et al. | 340/172.5 |
| 3,478,321 | 11/1969 | Cooper et al. | 340/172.5 |
| 3,543,242 | 11/1970 | Adams, Jr. et al. | 340/172.5 |
| 3,596,594 | 8/1971 | Ukitsu et al. | 340/172.5 |
| 3,716,837 | 2/1973 | Waddell | 340/172.5 |
| 3,766,526 | 10/1973 | Buchanan | 340/172.5 |
| 3,786,436 | 1/1974 | Zelinski et al. | 340/172.5 |
| 3,800,287 | 3/1974 | Albright | 340/172.5 |
| 3,825,902 | 7/1974 | Brown et al. | 340/172.5 |
| 3,925,766 | 12/1975 | Bardotti et al. | 340/172.5 |

*Primary Examiner*—Melvin B. Chapnick
*Attorney, Agent, or Firm*—Schuyler, Birch, Swindler, McKie & Beckett

[57] ABSTRACT

In a computer for executing a program made up of a plurality of instructions stored in an operational memory, in which the system is controlled by a set of microprograms stored in a read-only memory, the program instructions to be executed are transferred one at a time to a scratch pad memory, where they are used to address corresponding microprograms in the read-only memory. The microinstructions of the addressed microprogram are transferred one at a time to a microinstruction register, where each one is used to control the generation of a plurality of sets of commands to various components of the machine for executing the program instruction. The control unit includes means for transmitting control signals and data to the peripheral units with the data being already decoded into a form in which it is able to directly control the data output mechanism of the peripheral unit, without further modifications by a peripheral unit control unit.

8 Claims, 11 Drawing Figures

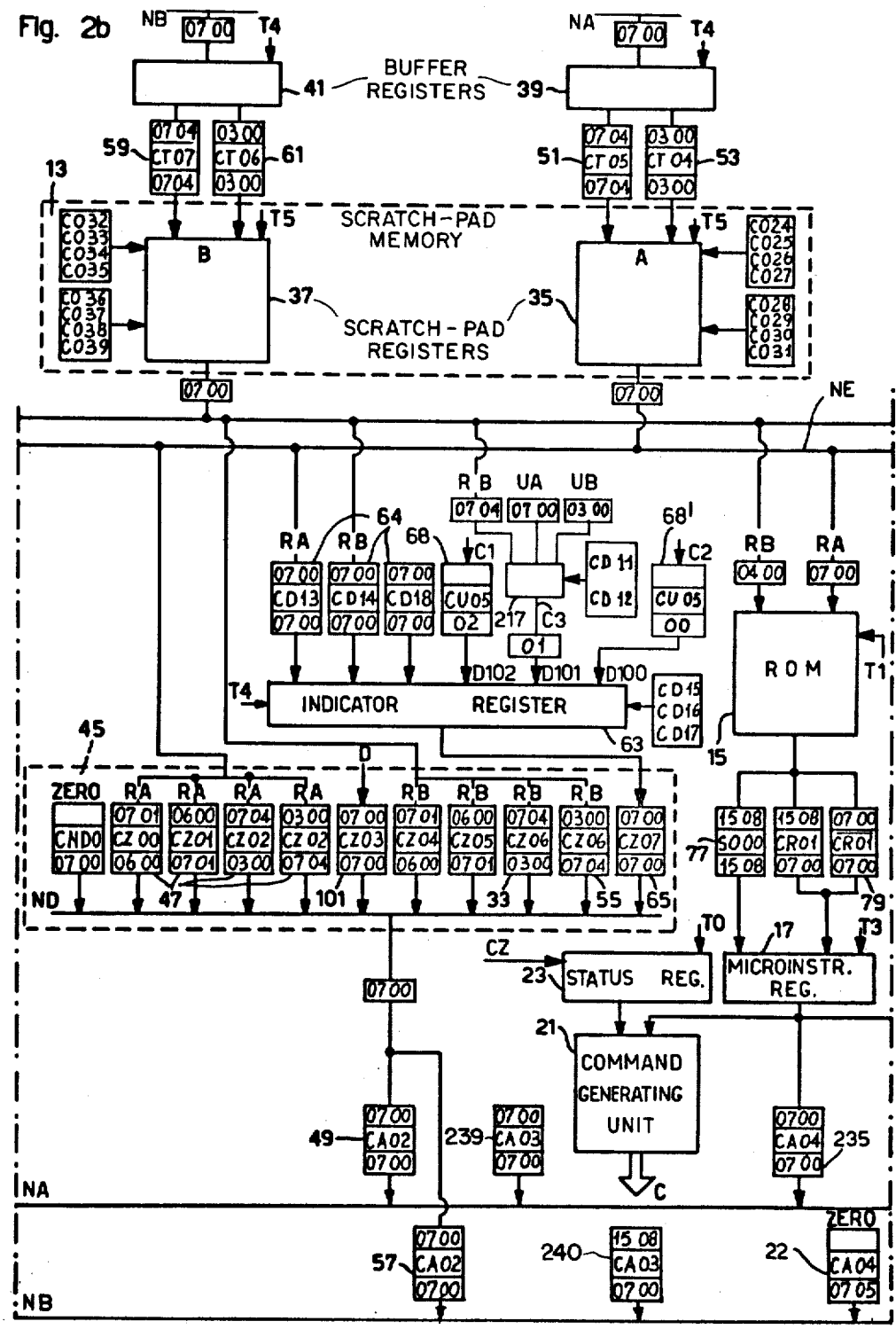

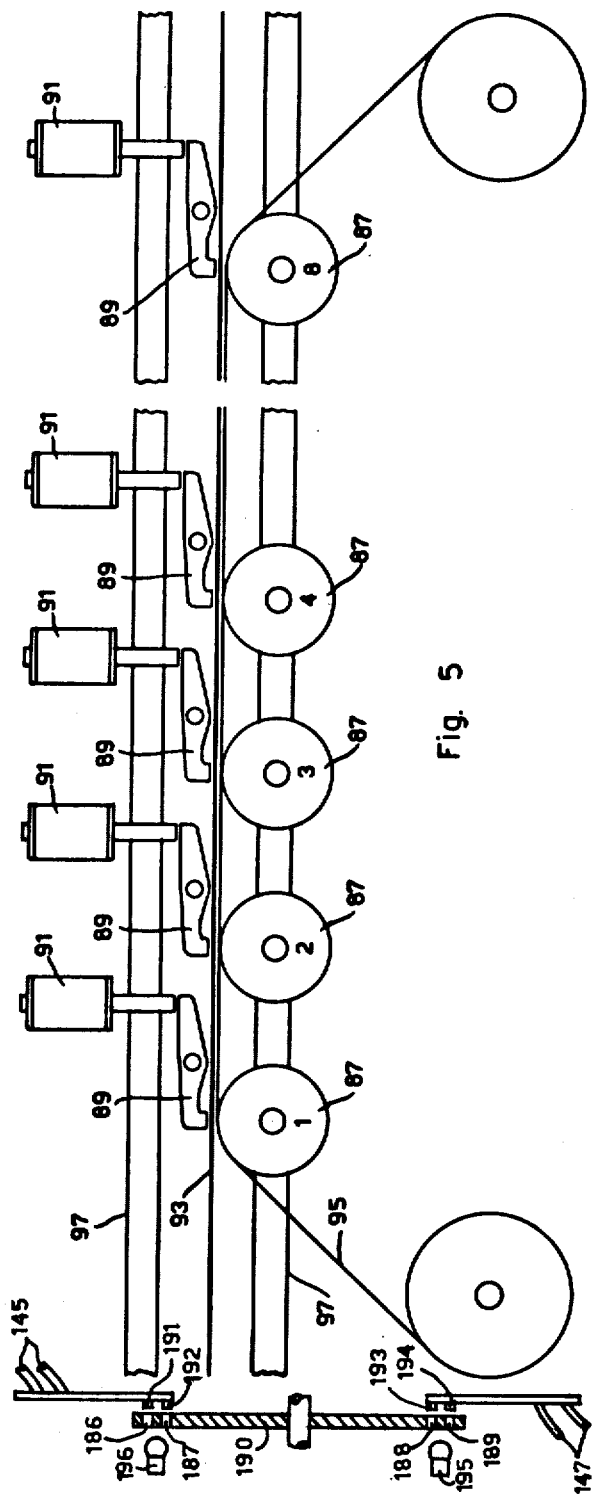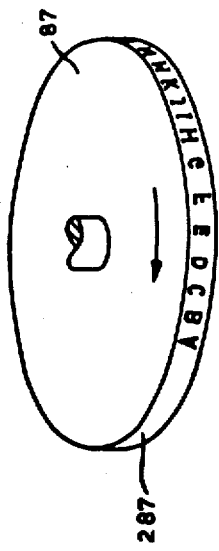
Fig. 5
Fig. 6

PRIORITY INTERRUPT HANDLING SYSTEM

CROSS REFERENCE TO RELATED APPLICATION

Applicants claim priorities from corresponding Italian patent applications Ser. No. 54152-A/69, filed Nov. 25, 1969, and Ser. No. 70229-A/70, filed Sept. 25, 1970.

This application is a continuation-in-part of the application Ser. No. 92777, filed Nov. 25, 1970, for "Electronic Computer now abandoned".

BACKGROUND OF THE INVENTION

This invention relates generally to electronic computers and more particularly to electronic computers using read-only memories to contain microprograms.

Computers may be divided into a plurality of classes depending on the use for which they are intended, among which are scientific, commercial and numerical control machines. These computers are able to execute an instruction set, which makes them particularly efficient when used in their own field, but are relatively inefficient when used in applications in other fields. As a result of their specialized nature, the potential market for any particular computer is only a fraction of the total potential market for computers of that size range. Since the selling price of any machine is to a large part dependent on the production level that can be achieved, these computers are more expensive than they would be if they had a wider range of usefulness.

General purpose computers attempt to solve this dilemma by providing an instruction repertoire which is acceptable for a wide range of uses. In practice, however, either the instruction repertoire is too small so that the computer is not very efficient in any application or the large amount of logic circuitry necessary to decode and execute all the instructions of a broad repertoire make the machine much too costly.

Attempts have also been made to solve the problem by the use of microprogramming, in which each program instruction corresponds to a microprogram. In this way, a machine with a given microinstruction repertoire may be specialized for different applications by changing the microprogram. Since each microinstruction orders a fairly elemental operation by the machine, the machine logic is greatly simplified.

In some cases the microprograms have been stored in the internal operational memory, which has allowed a great deal of flexibility in modifying the microprograms. However, since the access time of the internal operational memory, usually a core memory, is relatively long, and since the cost per bit is relatively high, either the machine is too slow or the logic is still complex on one hand, and either the microprograms take up too large a portion of the memory or the memory is quite large and expensive on the other. It is impossible in practice with this system to obtain a machine having all the features of low cost, high processing speed, and adequate program and data storing capacity.

Another type of computer stores microprograms in a read-only memory having a much faster access and lower cost per bit than a core memory in order to increase the processing speed while simplifying the logic. This machine does mot achieve the needed cost reduction, however, since the "microinstructions" of the microprogram are not really instructions but are actually decoded sets of commands. Each bit of the "microinstructions" corresponds to a particular unit of the machine and signifies whether that unit is to be activated or not. Thus, there must be a great number of bits in each microinstruction and the read-only memory must be very large and therefore expensive. Also since the portion of the machine which must be substituted to specialize the machine for a particular application is relatively large, only a limited cost saving is realized from this aspect.

Normally a central unit of a computer must provide for controlling various peripheral units and other control units. Operations of these units may require different amount of time and may involve only a small part of the central unit. In a microprogrammed computer each operation is controlled by a corresponding microprogram. Known central units normally process the various microprograms in series under the control of the main program, whereby the computer is relatively slow.

Known machines in transferring information to peripheral units, such as a printer, transfer the information to be printed to a buffer register in the printer. The machine also sends control signals to the control unit of the printer for causing it to decode the information in the buffer and to print it. The control unit of a printer or other peripheral must therefore be rather complex and expensive. This cost can be a very substantial factor in the total price of small scale computer system which may require several peripheral units, each with its own control unit.

SUMMARY OF THE INVENTION

In order to solve these and other problems there is provided a computer according to the invention which is able to execute a predetermined set of microinstructions. According to the invention, in an electronic computer having a central processing unit for executing a program made up of a series of program instructions, we now provide a memory for storing microprograms made up of a predetermined set of microinstructions and corresponding to selected program instructions, command generating logic for generating commands for executing each microinstruction, means for addressing said memory under the control of said command generating logic for fetching next microinstructions to be executed, means controlled by at least one microinstruction of each microprogram for generating interrupt signals of a plurality of priority levels to generate a request for access on a corresponding priority level of said central processing unit, and means conditioned by a signal of a predetermined priority to interrupt the execution of a microprogram of a lower priority level. More particularly, the computer includes an operational memory for storing the program and data to be operated upon, and a read-only memory, which stores a plurality of microprograms made up of microinstructions of the predetermined set, for executing a selected set of program instructions. Also included are a microinstruction register for receiving from the read-only memory microinstruction to be executed one at a time and means for decoding the microinstruction stored in the microinstruction register and for generating commands to the various components of the computer for executing the stored microinstruction. A scratch pad memory is provided for receiving and storing, under the control of said command generating logic, the program instruction to be next exectuted and the data to be operated upon and for addressing, under the control of the command generating logic, the read-only memory and the operational memory.

Also provided are means for connecting a printer and other peripheral units to the computer each having its own simplified control unit and means for sending to a buffer register in the control unit of a selected peripheral unit the already decoded signals for controlling the operation of the peripheral unit, for instance the commands for firing the printing hammers of the printer.

Various other advantages and features of the invention will become more fully apparent from the following specification with its appended claims and accompanying drawings, in which:

BRIEF DESCRIPTION OF THE DRAWINGS

FIG. 5 shows a portion of the printer which may be connected to the computer of the invention;

FIG. 6 shows a type wheel of the printer of FIG. 5;

DETAILED DESCRIPTION

The invention can best be understood from the following detailed description of the illustrated embodiment.

Figure 1:
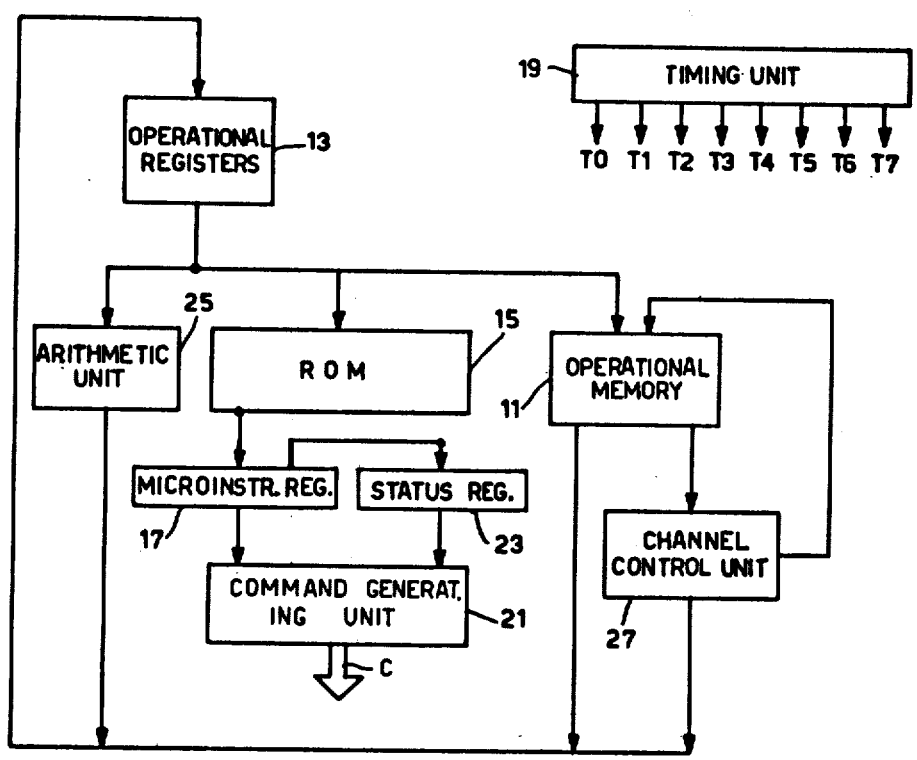
FIG. 1 is a block diagram of the central unit of a computer according to the invention.

Referring to FIG. 1 of the drawings, the computer comprises a central unit having a core memory 11, which is formed by a plurality of memory cells, each one adapted to store a byte of eight bits. To increase the capacity of the memory and/or the flexibility of the computer, the memory 11 may be modular, that is it may be formed of various modules each the capacity of 4000 bytes. In the illustrated embodiment, the computer may have up to four modules, as it will be clear later. The instructions of the program are originally stored in the core memory 11 and are transferred one at a time to a set of operational registers or scratch pad memory 13 for execution. All transferring operations between two different units of the computer are effected word by word, that is byte by byte. Each word may contain two coded numerical characters, each one formed of four bits, or a single alphanumeric character of eight bits, or a portion of either an address or an instruction.

Corresponding to each instruction of the program, there is stored in a read-only memory 15 a microprogram which comprises a plurality of microinstructions. Each microinstruction is formed of sixteen bits divided in various fields, which define in a predetermined code the operation to be effected and the data to be processed. Normally a microinstruction is divided in four fields, each one of four bits, called respectively, F, X, Y, Z. The field F possibly combined with one of the other fields defines the kind of operation to be effected. The other fields define the data to be processed in a manner to be described later.

The execution of a program instruction consists in the sequential execution of the microinstructions of the corresponding microprogram. The computer of the invention may be specialized for any application by merely providing a read-only memory 15 containing a repertoire of microprograms for executing a desired corresponding set of program instructions.

The microinstructions of the microprogram being executed are transferred, one at a time, from the read-only memory 15 to a microinstruction register 17, which is formed of sixteen flip-flops, which staticize the bits of a microinstruction of information read out from the read-only memory 15 at a determined address, whereby the microinstructions remain stored in the register 17 while being executed.

The timing signals for the computer of the invention are provided by a timing circuit 19, which may have a timing cycle, for example of 550 ns, corresponding to the execution time requested by an elemental operation of the computer. During each cycle, the timing circuit 19 sequentially generates eight timing pulses TO through T7 at the indicated outputs for timing operations of the various components of the computer.

The execution of each microinstruction is controlled by a status register 23 formed by eight flip-flops SOOO . . . SOO7, which are adapted to define the various cycles of the computer. The positioning of these flip-flops is controlled by the field F of the microinstruction stored in the register 17. U.S. Pat. No. 3,495,222 assigned to the Assignee in the present invention contains a description of a similar register.

Figure 8:
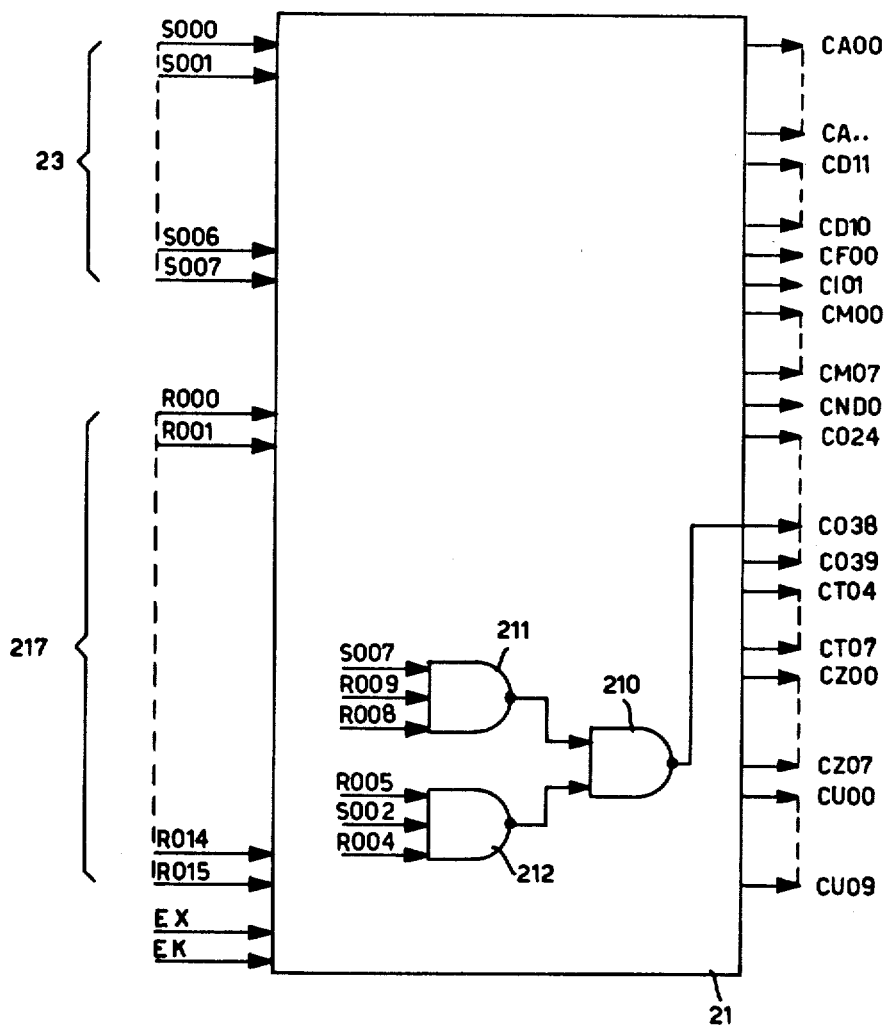
FIG. 8 is a diagram of the command generating unit included in the central unit of the computer.

The control unit moreover includes command generating unit 21, the operation of which is completely synchronous with the timing of the circuit 19. This unit 21 is constituted by a set of logic circuits which are controlled by the microinstruction register 17 and by the status register 23 to generate a set of commands or signals which are adapted to control various units of the computer. Particularly, the input of the units 21 (FIG. 8) is formed of the sixteen outputs of the flip-flops of the register 17 and the eight outputs of the flip-flops of the register 23. The output of the unit 21 is formed by several lines each one connected to one or more circuits and will be called later by a letter C followed by an alphanumeric code. The individual circuits for generating each command are conventional and are of the NAND type according to TTL technology. For example (FIG. 8) the command CU98 is generated by a NAND circuit 210 having as input the outputs of two other NAND circuits 211 and 212. Circuit 211 has as input the signal S007 of register 23 and the signals ROO8 and ROO9 of register 217, while the circuit 212 has as input the signals SOO2 of registers 23 and signals ROO4 and ROO5 of register 17. It should thus be clear that all commands of the unit 21 are generated by similar circuit, individually well known in the art.

The command generating unit 21 is responsive to the microinstruction stored in the instruction register 17 and to the status stored in the status register 23 for generating a plurality of commands which enable the operation of various circuits in the computer. Usually, the execution of a microinstruction requires the status register 23 to pass through a sequence of statuses, each of which lasts for one cycle of the timing circuit 19. At the end of each timing cycle the status register 23 changes to the next status which causes the command generating unit 21 to generate a new set of commands, which remain constant for the entire next timing cycle. The timing signals TO through T7 time the operation of the circuits for carrying out the micro-instruction by strobing the enabled circuits of the computer in proper sequence.

The microinstructions command the execution of various operations and can be classified as follows:

internal microinstructions, which control the processing of data stored in the central unit, the reading and writing cycles of the store 11 and the reading cycles of the read-only memory 15;

external microinstructions, which are used in exchange of data with the possible peripheral units, as will be better described hereinafter;

microinstructions for controlling the operations of the console;

microinstructions for controlling the microinterruptions.

These last two types will also be better explained hereinafter.

The execution of each microinstruction can be divided into two phases: the interpretative phase and the executive phase. In the interpretative phase, which is common to all the microinstructions, the microinstruction addressed is read in the read-only memory 15, the carrying out thereof is prearranged and one of the operational registers 13, which acts as an addresser for the read-only memory 15 as will be described hereinafter is incremented. In the executive phase the processing of the data occurs in the manner indicated by the microinstruction read in the preceding interpretative phase.

The interpretative phase of the execution of the micro-instruction is always developed in a single computer cycle and is identified by the flip-flop SOOO of the status register 23. The configuration of the signals set up within the limits of the cycle, which defines the operations to be performed, is called the interpretative status.

The executive phase is developed in one or more computer cycles (three at the most in the present embodiment), to which an equal number of executive states corresponds. Throughout the executive phase, the code of the microinstruction being processed stays fixed in the instruction register 17, while, on the other hand, the situation of the flip-flops of the status register 23 evolves. There are four executive status SOO1, SOO2, SOO3, SOO4 and they characterize the successive executive statuses. Each status defines the next on the basis of the code of the microinstruction read. At the end of the execution of a microinstruction, there is a return to the interpretative status SOOO for reading the following microinstruction in the read-only store 15.

After the status register 23 has passed through all the statuses required to execute the microinstruction stored in the instruction register 17, the next microinstruction of the micro-program, which is addressed by a read-only memory address in the scratch pad memory 13 is transferred to the instruction register 17 from the read-only memory 15 and the read-only address is incremented by the arithmetic unit 25, in a manner known per se.

Program instructions which require arithmetic or logical operations to be performed on data stored in the core memory 11 contain the addresses in the core memory 11 of this data. When one of these instructions is transferred to the scratch pad memory 13 for execution, the data in the core memory 11 addressed as specified in the instruction is first transferred to the scratch pad memory 13 under control of a microprogram in the read-only memory 15. After this has been done, the operations specified in the instruction are carried out, under the control of the corresponding microprogram of the read-only memory 15, in an arithmetic unit 25.

Figure 2A:
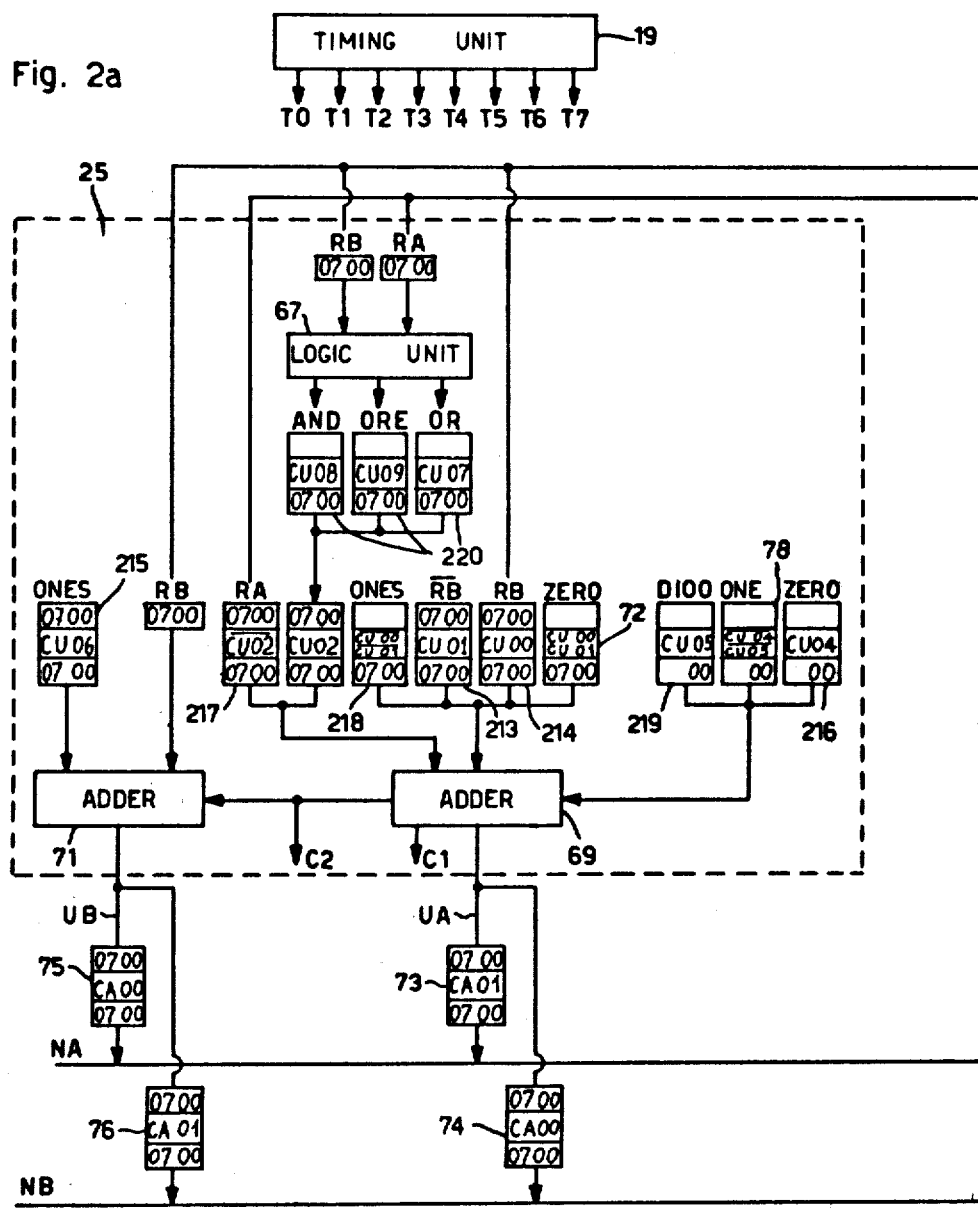
FIG. 2 is a schematic representation of the manner in which the detailed diagrams of FIGS. 2a thru 2c may be assembled to provide a more detailed block diagram of the computer according to the invention.

The arithmetic unit 25 is shown in more detail in FIG. 2a and includes a logic unit 67 which is able to effect the logical AND, OR and exclusive-OR operations, and two adders 69 and 71 operating with a parallelism of eight and interconnected in such manner as to obtain a single adder with a parallelism of sixteen. The adder 69 has an output for the eight least significant bits which are sent in direct parallel through the gates 73 and 74, respectively, to the busses NA and NB and from these to the accumulator registers 39 and 41 (FIG. 26). The adder 71 of arithmetic unit 25 moreover has an output for the eight most significant bits which are sent in direct parallel through the gates 75 and 76, respectively, to the busses NA and NB and then to the accumulator registers 39 and 41. The arithmetic unit 25 is capable of effecting the following elementary operations: A+B; A−B; A+1; A−1; B+1; B−1; L+1; L−1; A+O; B+O; L+O, as it will be described in more detail later.

The scratch pad memory 13 (FIG. 2b) is subdivided into two sections 35 and 37 each comprising 16 eight-bit registers. The registers of the two sections will be indicated hereinafter by the letters A and B, respectively, followed by an address expressed by four bits from OOOO to 1111. Two registers A and B of the like address may be treated as a single register, which will be indicated by the designation L followed by the common address. The part A of a register L is treated as the less significant in the arithmetic operations. The commands for selection of the operative registers 13 derive directly from the decoding of the two fields X and Y of the microinstruction. These specify in binary code the address of a register A or a register B according to the executive state in which the machine is. The two sections 35 and 37 of the scratch pad memory 13 receive the information through two corresponding accumulator registers 39 and 41.

The contents of each operative register of the memory 13 can be operated on with various microinstructions, which execute transfers, arithmetic operations, logical operations, etc. Each of the registers can perform in the course of the microprograms various functions, among which the main ones are as follows:

Addresser for the read-only memory 15:

this is in substance a register which specifies the address of a word in the read-only memory which is to be read. The addressers of the read-only memory 15 are distributed in the operative registers 13 of the memory in a fixed manner. In the present embodiment, since 13 bits are sufficient for identifying the read-only memory 15, if a register L is used, only the thirteen least significant bits are considered; if a register A is used, this is extended ideally to the left by five 0 bits.

Addresser for the core memory 11:

a register L or a register A is extended ideally to the left by eight 0 bits, which specify the address of a word in the memory 11 of which it is desired to effect the reading or writing. In the following, the registers of the memory 13 used as addressers of the core memory 11 will be indicated by the symbol M, instead of the symbol L or A, followed by an address between 0 to 15.

Storage for a datum to be exchanged with the core memory 11, with a peripheral unit, with the console, or to be handled in the course of the microprogram. The datum function can be performed in an equivalent manner by any one of the registers of the memory 13.

The microinstructions can address one of the registers A, B, L (or M) with the four bits contained in their portion X or Y.

Information to be transferred between the computer and external systems, such as peripheral units, transmission lines, etc. by means of the two channels controller 27 (FIG. 1), which will be more clearly described later. In the illustrated embodiment one of the channels is a single channel for the high speed peripheral units, while the other is a multiplex channel for the low speed peripheral unit, as it is known in the art. Other embodiments of the invention might use two single channels or two multiplex channels.

The transfer or information may take place pursuant either to the execution of a program instruction, to a request by the external unit or to the action of an operator, all of which generate an interruption signal. In any case as consequence of said interruption signal a special information transfer microprogram in the read-only memory 15 is executed to carry out the desired transfer. The execution of the main microprogram is then interrupted upon the completion of the execution of the current microinstruction in the instruction register 17 and a jump is executed to the information transfer microprogram. The address of the microinstruction in the corresponding microprogram to be executed next remains stored in the scratch pad memory 13, so that the execution of the program instruction may be resumed at the proper place.

The central unit of computer includes also an indicator register 63, formed of eight flip-flops D100 to D107, which is able to staticize events occurring during the execution of a number of microinstructions. Their contents are sensed during the execution of the microprograms to condition the jump of an address in the addressers of the read-only memory 15. Some of these flip-flops may be set according to the result consequent upon the execution of some arithmetical or logical microinstructions, for example, the existence of the carry between the fourth and the fifth bit, the existence of a carry after the eight bit, or the result of an operation being equal to zero. Particularly, the arithmetic unit 25 has two outputs $C_1$ and $C_2$ which are sent through the gates 68 and 68', respectively, to the register 63 to staticize the information if there is a carry after the fourth bit or after the eighth bit, and an output $C_3$ which is sent through a gate 217 to the register 63 to supply the information that the result of a certain operation is composed entirely of zeroes, as it will be more clearly described later. Some microinstructions are also able to introduce the eight bits contained in one of the operative registers A, B of memory 13 into the indicator register 63. Each flip-flop of the register 63 can in any case be positioned at zero, or at one, by two separate microinstructions in the format of which three least signicicant bits of the field X constitute the binary address (00 –07) of the concerned flip-flop of the register 63.

Figure 2C:
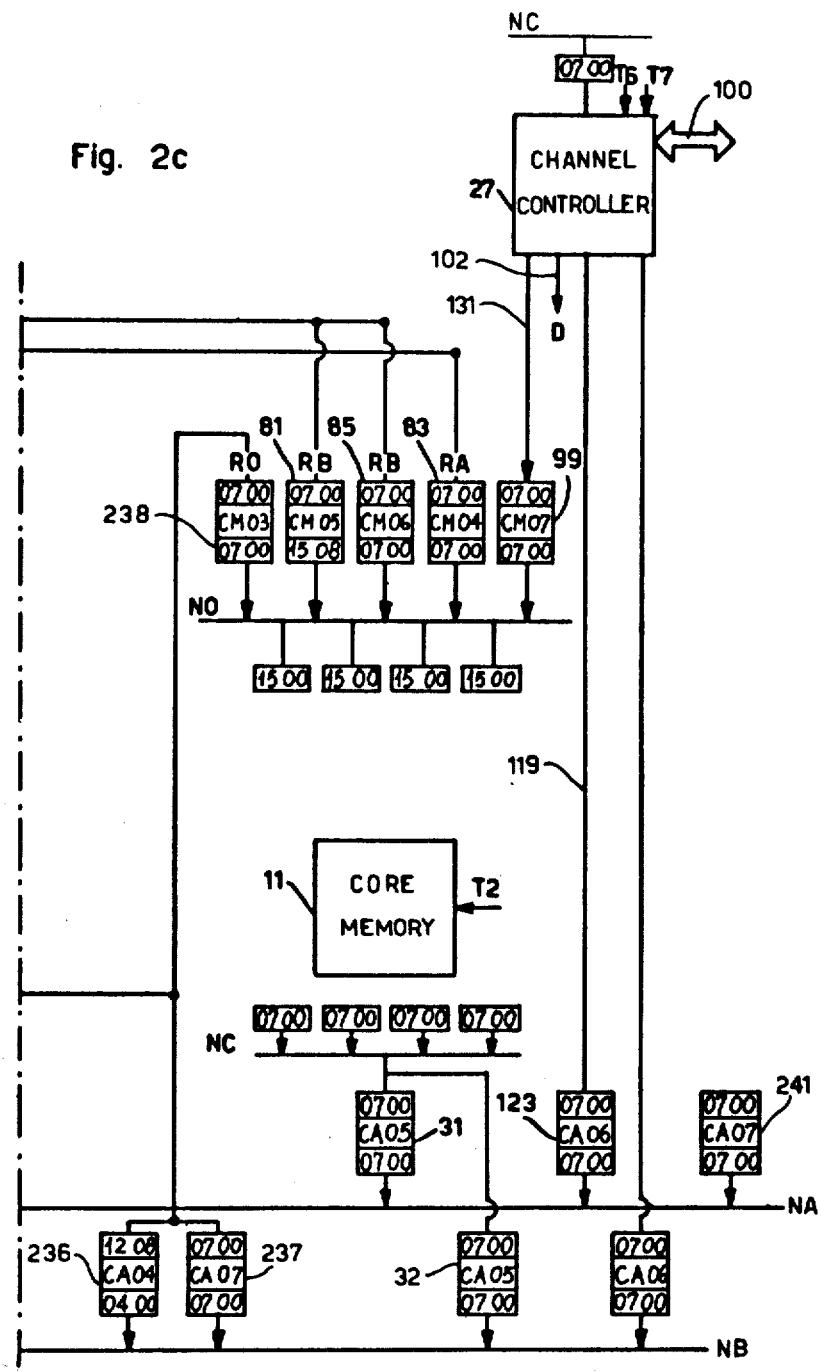

As already mentioned, the logic unit 21 supervises the flow of information between the various units of the computer on the basis of the contents of the instruction register 17 and of the status register 23. The information circulates between these units through a series of AND gates of various types which are controlled by a series of commands generated by the logic unit 21. In the drawings (FIGS. 2a, 2b, 2c) these gates are shown symbolically divided into three zones. The central zone contains the control command of the gate generated by the logic unit 21. When this command is present, the signals at the input of the gate are transferred to the unit connected with the output of the gate. The pair of numbers varying from 00 to 15 which is in the top zone and the pair of similar numbers which is in the bottom zone of the gates, indicate the number of bits which they allow to pass and, more precisely, the positions in which these bits are at input and output. For example, a gate 49 (FIG. 2b) having the pairs of numbers 07, 00 both as input and as output is a gate which transfers an eight-bit word in parallel. On the other hand, a gate 55 having in the top zone, that is as input, the pair of numbers 03, 00 and, in the bottom zone, that is as output, the pair of numbers 07, 04 is a gate which transfers four bits by shifting them to the left by four places. If 07, 04 are input and 03, 00 are output as in a gate 33, the shifting is by four places to the right. Finally, if the input zone is empty, as in gate 22, this signifies that the bits are forced into the gate from outside, for example from the console. If the intermediate zone is empty this signifies that the transfer is unconditional, that is not controlled by the logic unit 21.

Instructions and data stored in the memory 11 (FIG. 2c) are transferred a byte at a time for processing to the A or B portions 35 or 37, respectively, of the scratch pad memory 13 (FIG. 2b) via buffer registers 39 and 41, respectively, under control of the microprogram. The portions 35 and 37 of the scratch pad memory 13 each may include 16 one byte registers.

A particular register of scratch pad memory 13 may be addressed by a combination of two commands generated by the command generating unit 21. For instance, to select a register of the B portion 37, one command from the group CO32 to CO35 and another command from the group CO36 to CO39 are generated. As it has been described, the registers of the memory 13 may be used independently or corresponding registers of the two portions A and B may be paired and used together as a single 16 bit register. In this description a pair of registers will be referred to as Lx and a single register as Ax or Bx; where x may be between O and 15. LO, for instance, is the pair of registers constituted by the first register AO in the A portion 35 and the first register BO in the B portion 37. Since the address of a byte in the memory 11 is 16 bits long and the address of the microinstruction in the read-only memory 15 is 13 bits long, the core memory address of the next program instruction to be executed and the read-only memory address of the next microinstruction to be executed are stored in the pairs of registers LO and L1 respectively in the scratch pad memory 13. The program instruction being executed is also stored in the scratch pad memory 13 starting from register A3.

The pair of registers L2 of the scratch pad memory 13 is used to hold the address in the read-only memory 15 of a supervisory microprogram. This microprogram is used to process certain micro-interrupts originating from peripheral units, from error conditions, from actions by operator or from other things, as will be discussed in more detail later. The addresses of the microprograms which control the transfer of a single byte of information on the channel controller 27 are stored in registers A12 and A13, respectively of the scratch pad memory 13. Only a single register is necessary to store these addresses since both microprograms are quite short and are stored in the beginning portion of the read-only memory 15 so that the more significant bits of the addresses are all zero.

The contents of a register in the scratch pad memory 13 may be shifted one place in either direction end-off or 4 places end-around by means of the group of gates 45 (FIG. 2b), all of whose outputs are connected to a bus ND. For instance, to shift the contents of a selected register of the A portion 35 of the scratch pad memory 13 by one place to the left end-off, the register is addressed by a pair of commands CO24–CO27 and CO2-8–CO31 generated by the command generating unit 21. A bus NE is connected to a gate 47 of the group 45, the gate 47 being enabled by the command CZ01 of the unit 21. At the same time the gate 49 is enabled by the command CA02 generated by the unit 21, and transfers the shifted bits to the buffer register 39 via a bus NA. Next two gates 51 and 53 are enabled by commands C005 and C004, respectively, for entering the two groups of four shifted bits back into the selected register of scratch pad memory 13. The gate 47 outputs the bits received on lines 06 00 to lines 07 01, thereby shifting them one place to the left. The bit originally in place 07 is lost since the shift is end-off.

For another example, in order to shift the bits of a selected register of the B portion 37 of the scratch pad memory 13 by four places end-around, the selected register is addressed by a pair of commands CO3-2–CO35 and CO36–CO39 of the command generating unit 21 and gates 33 and 55 are enabled by command CZ06 of the unit 21. At the same time gate 57 is enabled by command CA02 of the unit for transferring the shifted bits to the buffer 41 via another bus NB for being rewritten via gates 59 and 61 in the selected register of the scratch pad memory 13.

The indicator register 63 may be used to operate on individual bits of a selected register of the scratch pad memory 13, or to store conditions entered by the operator from the console or by means of the program. The contents of the indicator register 63 may be transferred unshifted to a selected register of the scratch pad memory 13, by means of gate 65, which is enabled by command CZ07 of the command generating unit 21, and either gates 49 or 57.

Gate 64, which is enabled by command CD18 is used in conjunction with commands CD15, CD16 and CD17 for entering a "one" into a selected bit place of the register 63. The three least significant bits of the register 63 may also be used to store the carries and correction bits which are generated by the arithmetic and logical unit 25 during operations on data.

The outputs T0 through T7, from the timing circuit 19, are connected to the various components of the computer for enabling them to receive only during the time period when the corresponding timing signal is present. In this way the status register 23 is enabled to receive a change of status command only during time T0.

The read-only memory 15 can receive an address from the scratch pad memory 13 only during time T1. This address is stored in an address buffer (not shown separately) in the read-only memory 15 and selects a particular location in the read-only memory 15 until it is replaced with a new address.

The core memory 11 (FIG. 2c) is enabled to receive an address or data only during time T2 and the microinstruction register 17 (FIG. 2b) is enabled to receive an instruction from the read-only memory 15 only during time T3. During the time T4 the buffer registers 39 and 41 are enabled to receive information to be stored in the scratch pad memory 13 and the indicator register 63 is enabled to receive an input signal. The scratch pad memory 13 is enabled to receive the information stored in the buffer registers 39 and 41 during time T5 and, during time T6 and T7, signals can be sent to the peripheral units through the channel controller 27 (FIG. 2c) in order to synchronize their operation.

As already mentioned, the microinstructions of the microprograms stored in the read-only memory 15 are each 16 bits long. The first four bit field F constitutes an operation code, while the other 12 bits are divided into three fields, X, Y and Z. These fields may contain addresses of registers in the scratch pad memory 13, the addresses of locations in a protected portion of the core memory 11, which is reserved for use as a service area by the microprograms, an address of a location in the read-only memory 15, constant data, bits which further specify the operation to be performed and other information.

The six flip-flips of the status register 23 include five flip-flops S000 through S004 corresponding to five statuses, and the sixth flip-flop S005, being an OR function of certain of the five statuses. Only one of the five status flip-flops is set at any one time. The setting of a flip-flop corresponding to the next status acts to reset the flip-flop corresponding to the previous status. The status S000 is a basic status which is set at the beginning of the execution of each microinstruction.

In the execution of a microinstruction, the initial setting of the basic status, S000, causes the command generating unit 21 to generate the commands C033, C036, C025 and C028 (FIG. 2b) necessary to address the registers L1 in the scratch pad memory 13 which store the address on the read-only memory 15 for the next microinstruction to be executed. The addressed microinstruction is transferred from the read-only memory 15 to the instruction register 17 by means of gates 77 and 79, the former of which is enabled by the basic status S000 and the latter is enabled by the fact that the command CR01 is not present.

The setting of the basic status S000 also causes the command generating unit 21 to generate the commands for incrementing the address of the read-only memory 15 in register L1 with the use of the arithmetic unit 25. More particularly, during this status the command generating unit 21 generates the four "CO" commands necessary for addressing the pair of registers L1 and the commands CT04, CT05, CT06, CT07, CA01, CU00 and CU01 necessary for enabling the gates 51, 53, 59, 61 of the scratch pad memory 13 and the gates 73, 213 and 214 of the arithmetic and logic unit 25.

The addressing of the scratch pad memory 13 does not depend on the timing circuit 19 and occurs during all eight timing periods of the status S000. The read-only memory 15 is enabled for being addressed by the scratch pad memory 13 and the address from registers L1 is transferred to the address buffer in the read-only memory 15 during the timing period T1, whereas the instruction register 17 is enabled to receive the new instruction from the read-only memory 15 during the timing period T3.

The commands CU00 and CU01 to the gates 213 and 214 (FIG. 2a) of arithmetic unit 25 cause the portions of the address stored in the A and B portions of the scratch pad memory 13 (FIG. 2b) to be gated through the adders 69 and 71 (FIG. 2a), respectively, and to be incremented by means of gate 78 which is then forced by the current microinstruction.

The incremented address is gated through gates 73 and 75 under the command CA01 of the unit 21 to the inputs of buffer registers 39 and 41 (FIG. 2b), respectively which are enabled to receive them at time T4. At time T5 the incremented address is gated back to the register L1 of the scratch pad memory 13.

It is thus clear that the microinstruction stored in the instruction register 17, together with the status of the status register 23, causes the command generating unit 21 to generate a set of commands. These commands are present on the output lines of the command generating unit 21 for one cycle of the timing circuit 19. The timing circuit 19 generates a series of eight pulses TO through T7 in each cycle which enable the various units of the computer to receive the commands from the command generating unit 21 in the proper sequence. At the end of each cycle of the timing circuit 19, the status register 23 switches to the next status which causes the command generating unit 21 to generate a new set of commands. It is also clear that the address of a microinstruction can be incremented by one through the operation Lx+1.

The AND, OR and EXCLUSIVE OR (ORE) functions of the contents of a selected A register and a selected B register of the scratch pad memory 13 are generated at separate sets of three outputs of the logical unit 67, indicated by the same name of the function. The particular function desired may be selected by commands CU08, CU07 or CU09, respectively of the unit 21, through three corresponding gates 220. The result may be gated through the adder 69 upon the command CU02 to replace the input of the buffer register of the group A. In any case the result of the operation of the adder 69 is returned to the A or B portions, 35 or 37, of the scratch pad memory 13 by commands CA01 or CA00, respectively, through gates 73 and 74.

The adder 71 is used to handle the more significant bits when a core memory address or a read-only memory address stored in corresponding pairs of A and B registers of the scratch pad memory 13 are to be incremented. For this purpose there is a carry designated "C2", between the most significant bit of the adder 69 and the least significant bit of the adder 71. By generating a command CU06, gate 215 causes the adder 71 to add a number formed of eight bits equal to one, that is the operation Bx-1.

Although the numerical data is coded in a binary-decimal code, the organization of the adders 69, 71 is completely binary. This allows the address of the core memory 11 and of the read-only memory 15 to be incremented straightforwardly and requires that corrections for taking into account the decimal denomination be made in the result of an addition or subtraction by means of a special microprogram.

The addition microprogram, which orders the addition of the two, two-digit bytes from a selected A register through gate 217 and a selected B register through gate 214, first causes the adder 69 to add 66, i.e. 0110 0110, to the contents of the selected A register so that, if the sum of digits of the selected registers is 10 or more, a carry bit is generated to the next higher order digit. Next the two bytes are added and finally the necessary corrections are made.

In order to add 66 to the contents of the selected A register, the microprogram first transfers 66 to a preselected B register of the scratch pad memory 13 by means of a microinstruction which contains, in its Y and Z fields, the 8 bits to be transferred and, in its X field the address of the B register which is to receive the bits. Next the contents of the selected A register and the preselected B register are added in adder 69 and returned to the selected A register under control of an addition microinstruction. The microprogram then orders the addition of the contents of selected A and B registers in the adder 69.

The signals C1, C2, C3 (FIG. 2b) are used by the central unit, in performing this addition by making use of the three least significant bits, DI00, DI01, and DI02, of the indicator register 63. If a carry bit is generated by the addition of the bits 03 (i.e., the most significant bit of the less significant digit) the signal C1 is used both in the addition of the bits 04 and to set the bit DI02. In like manner a carry bit C2 generated by the most significant bit 07 is used to set the bit DI00. The bit DI00 is then used as a carry bit into the least significant bit of the next pair of digits being added if the program instruction orders the addition of multidigit numbers. To perform these operations the command generating unit 21 generates command CU05 which through gates 68 and 68' both gates the carry bits C1 and C2 into the indicator register 63 and through the gate 219 gates the previous contents of the bit DI00 into the least significant bit 00 of the adder 69. The sum is gated back either to the selected A register or the selected B register depending on the microinstruction.

The bit DI01 is set if the result is all zero. This information may be useful when the result of an arithmetic operation is all zero, for instance in comparison, subtraction or decrementing operations.

The particular correction which must be made depends on which of the bits DI00 and DI02 are set. If they are both set this indicates that the addition of each digit resulted in a sum greater than 9 so that the result is correct and no correction has to be made. If only bit DI02 is set, indicating a carry bit out of the less significant digit, the sum of the two less significant digits is greater than 9, (i.e., the sum with the addition of the 6 is 16 or more), and therefore is correct. The sum of the two more significant digits, however, is less than 10, (i.e., the sum with the addition of the 6 is less than 16), and the 6 must be resubtracted from it. This is accomplished by adding the 2's complement of 6 to the more significant sum digit. The microprogram therefore orders the transfer of the byte 1010 0000 from the Y and Z fields of the microinstruction stored in the microinstruction register 17 to a preselected register of the other portion of the scratch pad memory 13 from that storing the sum byte. The microprogram next orders the addition of the sum byte and the contents of the preselected register in the adder 69. This time, however, the command generating unit 21 generates the command CU04 instead of CU05 so that gate 216 causes no change in the bits of the indicator register 63.

If neither of bits DI00 nor DI02 are set, indicating that neither sum digit is greater than 9, the 6 must be resubtracted from both sum digits. To accomplish this the one's complement of 6 is added to each sum digit and a one is added to the least significant bit. The microprogram transfers the byte 1001 1001 from the read-only memory 15 to the scratch pad memory 13 and then adds it to the sum byte in the adder 69. In this case the command generating unit 21 generates neither CU04 nor CU05 so that a one is added by gate 78 to the bit 00 of the adder 69. This converts the one's complement of the less significant digit to the two's complement. The one's complement of the more significant digit is converted to the two's complement by the carry bit out of the most significant bit, 03, of the less significant digit.

If only DI00 is set, indicating that only the more significant sum digit is greater than 9, the one's complement of 6 is added to the less significant digit and a one is added to the bit 00 to convert the one's complement to the two's complement. Thus the byte 0000 1001 is added to the sum byte and neither command CU04 nor CU05 is generated. In this case only the 4 less significant bits of the byte are gated back to the register in the scratch pad memory 13 because the carry bit C1 acts to increment the more significant digit in the byte. Since the scratch pad memory 13 has non-descructive readout the original bits of the more significant result digit remain.

Subtraction may be performed in a similar manner with the use of the adder 69 and the gate 213 activated by the command CU01. Multiplication and Division may also be performed, either by providing a special microprogram for each, which performs the entire operation, or by providing shorter microprograms and making use of the addition and subtraction microprogram, respectively. The first method is faster than the second but requires more room in the read-only memory 15 for storing the microprogram. In the illustrated embodiment of the invention the second method is used on order to conserve space in the read-only memory 15.

The contents of a selected register of the scratch pad memory 13 may be decremented with the use of the adder 69 or 71, depending on whether the register is in the A portion or the B portion 37, respectively, by adding the two's complement of one (i.e., 1111 1111) to them. This addition is accomplished with the use of commands CU04 or CU06, and gates 218 and 215, respectively. If a core memory or read-only memory address is to be decremented both adders are used simultaneously.

The read-only memory 15 may be thought as having a plurality of "pages" with the 5 bits 04 00 of the B register being used to select a particular "page" and the bits in the A register being used to select a location in the "page". Thus, by the different address codes in the B register of the preselected pair, the address in the A register of the pair can be used to address different locations in the read-only memory 15.

In transferring information from the scratch pad memory 13 to the memory 11, the command generating unit 21 generates the command C024 C039 for selecting a pair of registers in the scratch pad memory 13 which contain the address of the desired core memory location and also generates commands CM04 and CM05 for gating this address through gates 81 and 83 (FIG. 2C) to the memory 11 during time T2. When the address is present at the output of these gates of the memory 11 reads this address into an address buffer (not shown separately). Next the command generating unit 21 generates commands C024 . . . C039 for addressing the register in the scratch pad memory 13 whose contents are to be transferred and either command CM04 or CM06 for enabling gates 83 or 85 depending on whether the selected register is in the A or B portion 35 or 37 of the scratch pad memory 13, respectively. The memory 11 enters during time T2 the information present at the input into the addressed memory location via a data buffer register (not shown separately).

Information may be transferred from the core memory 11 to the scratch pad memory 13 in a similar fashion. First the address of the selected location in the memory 11 is transferred from the scratch pad memory 13 to the address buffer in the memory 11 as above and next the register to receive the information in the scratch pad memory 13 is addressed. When the memory 11 indicates that the information is ready in the data buffer, it is transferred to the addressed register in the scratch pad memory 13 in the usual fashion.

As already mentioned hereinbefore, each of the registers of the scratch pad 13 can perform in the course of the microprograms the function of addresser for the read-only memory 15. In the embodiment illustrated, there are four operative registers $L_1$, $L_2$, $L_3$ and $L_4$ of the scratch pad 13, which are used in fixed manner as addressers of the read-only store 15. Each one of these four registers constitutes the addresser of a corresponding microprogram, which is carried out normally in sequence, by increasing addresses of microinstructions, the address contained in the relevant addressing register being incremented by one S000 at each interpretative status S000 of the register 23.

Figure 4:
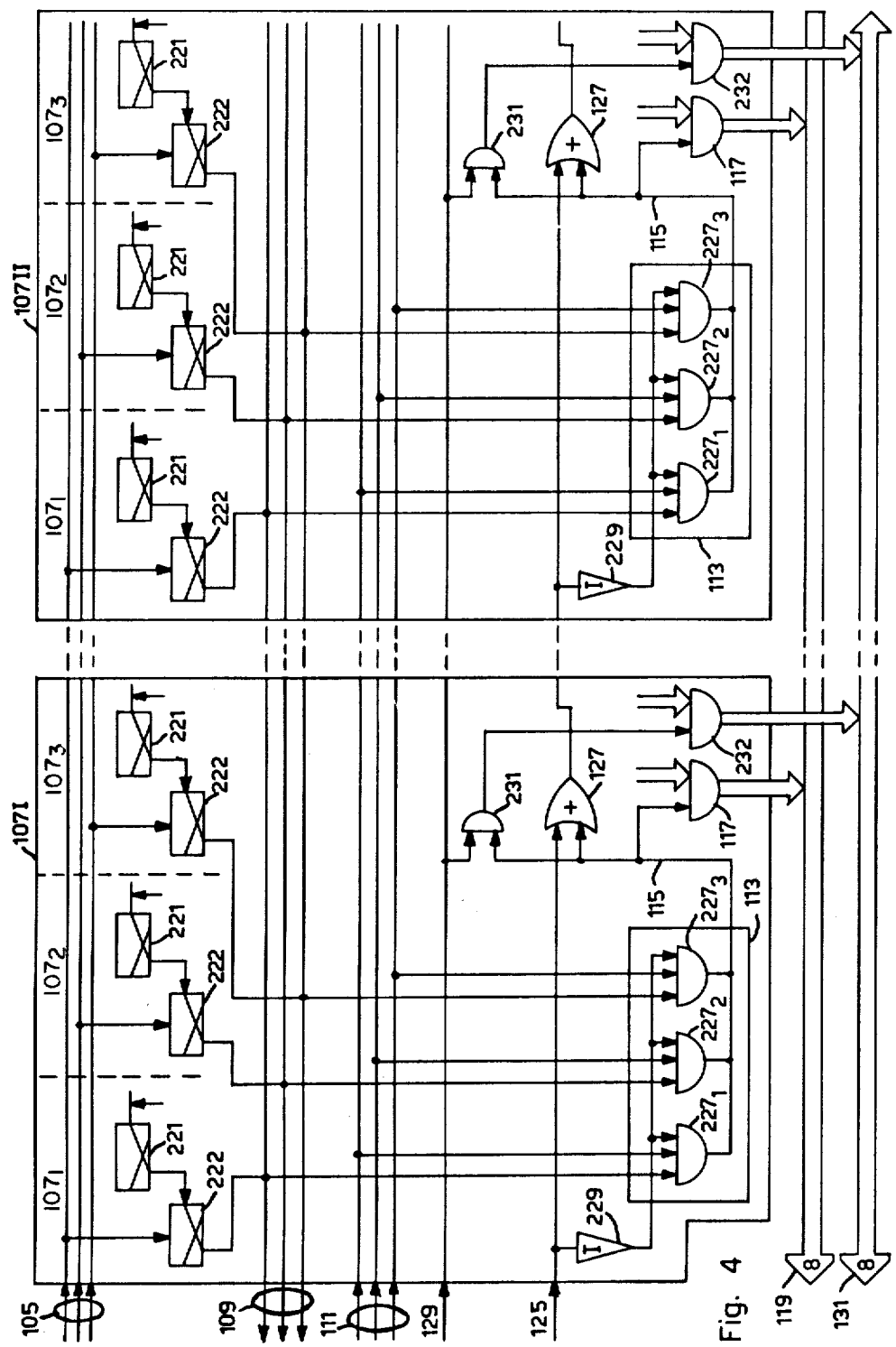
FIG. 4 shows some of the connections between the peripheral units and the central unit.

The channel controller 27 (FIG. 2C) controls the connections between the central unit and a set of peripheral units and the operative priority of the peripherals themselves. More particularly, the channel controller 27 is connected to the central unit by means of a set of conductors, generically indicated with the numeral 102 in FIG. 2C. The controller 27 is also connected through a second set of conductors, generically indicated by the numeral 100 to a set of peripheral units 107 of which only two units indicated as I and II are shown in FIG. 4. The two units I071 and I07II, as illustrated, each include three devices $107_1$, $107_2$, $107_3$. Each one of the three priority levels, is associated with one of the other addressing registers $L_1$, $L_2$, $L_3$. The controller 27 supervises the execution in parallel of various microprograms associated with the various peripheral unit devices. Particularly, the following categories of microprograms are provided:

The basic microprogram, of priority 4 and addressed by register $L_4$, normally having the function of interpreting the executing the instructions of the program by processing the data and starting the input and output operating devices;

A microprogram of priority 3 and addressed by register $L_3$, normally intended for carrying out operations which do not come within the predetermined time sequence of the program, for example presettings of interruptions in the program, microprogrammed control of input-output operating devices more complex than a simple exchange of data;

Microprograms of priorities 2 and 1 and addressed by registers $L_2$ and $L_1$ respectively normally intended for effecting the transfer of data from a device of a peripheral unit 107 to the core memory 11 or vice versa.

The execution of these four microprograms is parallel in the sense that each of them has its own addressing register $L_1$, $L_4$ and can be incremented by one as soon as the need occurs. The central unit, however, is able to execute only one microinstruction at a time; if a plurality of microprograms are activated at the same time, the central unit through the controller 27 gives priority to the one of higher priority, in the order of priority 1,2,3,4.

Under normal conditions, the basic microprogram is always active, while the others are inactive; their activation occurs through the sending of suitable signals, referred to hereinafter as microinterruptions generated by the peripheral units or by the central unit. The microinterruptions are able to interrupt the execution of a microprogram, at the end of the current microinstruction, to pass the control of the computer to a microprogram of higher priority. To this end each device $107_1$, $107_2$ and $107_3$ of each peripheral unit 107I-107II includes a first flip-flop 221 settable to indicate that an operation of the relevant device is required. Another flip-flop 222 is settable to generate a corresponding microinterrupting signal or microinterruption.

The microinterruptions are divided into three main groups corresponding to the priorities of the microprograms which they activate and will be called $\mu I_1$, $\mu I_2$, $\mu I_3$ according to the relevant priority. Now the execution of a computer program is described.

The last microinstruction of the basic microprogram of a program instruction orders the transfer, to the read-only memory 15 address register (FIG. 2b) in the scratch pad memory 13, of the address of the first instruction of the basic microprogram. This address is contained in the first 13 bits of this last microinstruction and is transferred to the buffers 39, 41 by command CA04 of the generating unit 21. The basic microprogram orders the transfer of the next program instruction from the memory 11 (FIG. 2) to the scratch pad memory 13 for processing and performs other operations which depend on the particular application for which the computer is specialized.

In the illustrated embodiment of the invention the program instructions may be either 2, 4 or 6 bytes long. The first byte contains an operation code which defines the operation to be performed and specifies the number of bytes in the instruction. The other bytes of the instruction may contain addresses in memory 11 of data, the length of the data field to be operated upon, constants, jump addresses and other information.

The basic microprogram first transfers the first byte of the instruction to register A3 of the scratch pad memory 13 and increments the program instructions address in registers LO with the use of adders 69 and 71 (FIG. 2a). Next the basic microprogram operates on the operation code with the use of the arithmetic and logical unit 25 to determine how many more bytes are contained in the program instruction and stores this number in register A14 of the scratch pad memory 13 (FIG. 2b). The basic microprogram then transfers the next byte of the program instruction from the core memory address specified in register LO to the scratch pad memory 13, increments the core memory address in register LO and decrements the contents of register A14. The basic microprogram then checks the contents of register A14 and, if they are not zero, performs the transfer of the next byte, incrementing the core memory address register LO and decrementing register A14. The process continues until the contents of register A14 are equal to zero indicating that the entire program instruction is transferred to the scratch pad memory 13.

The basic microprogram, in transferring the program instruction to the scratch pad memory 13, arranges the various portions of the instruction in preselected registers for processing by the microprogram which corresponds to the program instruction. Any core memory addresses contained in the instruction are arranged in corresponding pairs of registers.

In a preselected portion of the read-only memory 15 there is stored a table of jump instructions which order jumps to the microprograms which corresponds to the various program instructions. In order to jump from the basic microprogram to the microprogram corresponding to the program instruction to be executed, the basic microprogram stores a preselected code in register B3 and causes the command generating unit 21 to address the read-only memory 15 with the contents of registers A3 and B3. Thus the operation code in register A3 is used as the address of a jump instruction in the table. The jump microinstruction is transferred to the instruction register 17 where it orders the transfer of its 13 least significant bits to the register L1 of the scratch pad memory 13. The address of the microprogram corresponding to the program instruction to be executed is thereby stored in the read-only memory address register L1 and its execution may begin.

As already mentioned, communication between the central unit of the computer and peripheral units 107 is accomplished through the channel controller 27 which is used to couple them according to a multiplex channel connection and according to a single channel which can be of the type disclosed in the U.S. Pat. No. 3,544,966 to John J. Harmon, entitled "Method and Apparatus for Multiplex Control of a Plurality of Peripheral Devices for Transfer of Data with a Central Processing System." The multiplex channel allows a plurality of peripheral units 107 attached thereto, to communicate with the central unit simultaneously, taking advantages of the fact that the central unit is much faster than any of the peripheral units. The single channel allows the peripheral units attached thereto to communicate with the central unit one at a time but at a much higher data rate than with the multiplex channel. The peripheral units 107 shown in FIG. 4 are connected in the single channel mode.

Information received from the peripheral units 107 is entered through the conductors 131 (FIG. 2C). under the control of the command CM07 of generating unit 21, into the core memory 11 through gates 99 as it will be more clearly described later. A conductor D 102 under the command CZ03 of the generating unit 21 (FIG. 2B) causes a gate 101 to enter information from the controller 27 into the scratch pad memory 13. Information is sent directly from the memory 11 to the peripheral units by means of the bus NC (FIG. 2C), which is connected to the input of the channel controller 27.

The operation of the memory 11 is controlled in the same way as was described above with gates 99 being used instead of gates 83 or 85 for the entry of data into the memory 11. Similarly information from the memory 11 is entered into the scratch pad 13 under the command CA05, via gates 31 and 32, and busses NA,NB. The content of the microinstruction register 17 (FIG. 2b) may be entered into the scratch pad memory 13 under commands CA 04 and CA07 via gates 235,236 and 237 and into the core memory 11 under the command CM03 via gate 238. Finally, data from the console not shown are entered into the scratch pad memory 13 under command CA03, via gates 239 and 240 and busses NA and NB, whereas console conditions are entered into section A of memory 13 under command CA07 and bus NA.

Each peripheral unit 107 (FIG. 4) includes an enabling logic unit generically indicated by the numeral 113 and may include up to three different devices each one of which may be operated by a relevant microprogram according to a predetermined priority. In FIG. 4 the devices $107_1$, $107_2$ and $107_3$ are operable respectively to a 1, 2 and 3.

Figure 3:
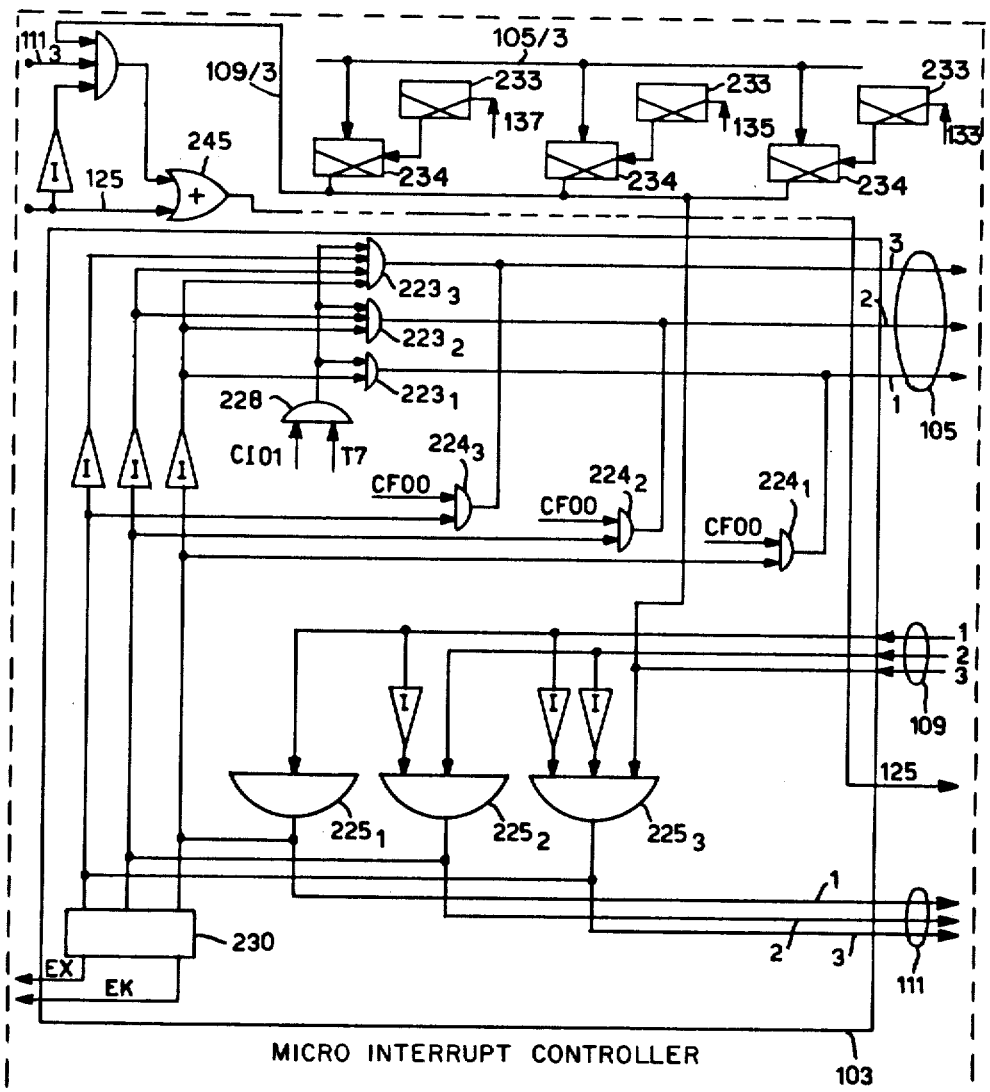
FIG. 3 is a more detailed diagram of the two channel controller according to the invention.
Figure 3:
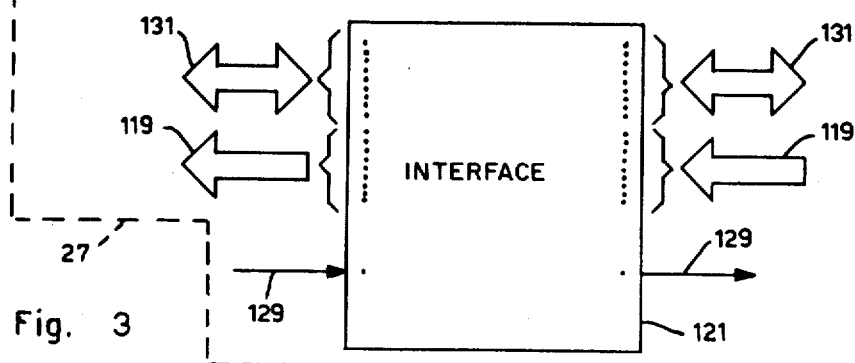

The channel controller 27 (FIG. 3) includes a logic circuit 103 having the function of controlling the microinterruptions $\mu I1$, $\mu I2$, $\mu I3$ and will hereinafter be called microinterrupt controller. This controller includes a set of three AND gates $223_1$, $223_2$ and $223_3$ each one connected by means of a corresponding line 105 to the flip-flop 221 of the devices $107_1$, $107_2$ and $107_3$ having the corresponding priority. The output of the gates $223_1$, $223_2$ and $223_3$ have an OR connection with another set of three AND gates $224_1$, $224_2$, $224_3$ on the lines 105. The microinterruption controller 103 also comprises a set of three AND gates $225$, $225_2$, $225_3$ the input of which is connected through corresponding lines 109 to the output of flip-flop 222 of the relevant priority.

The outputs of the gates $225_1$, $225_2$ and $225_3$ are connected through corresponding lines 111 to the corresponding gates $227_1$, $227_2$ and $227_3$ included in the enabling circuit 113 and each one is adapted to cause this circuit to operate the relevant device $107_1$, $107_2$ and $107_3$ of the peripheral unit 107. The outputs of the gates $225_1$, $225_2$, $225_3$ are also connected through inverters to the inputs of the gates $223_1$, $223_2$ and $223_3$.

During the last status of the execution of any microinstruction, the command generating unit 21 sends a command CI01 to an AND gate 228 of the microinterrupt controller 103 (FIG. 3) of the channel controller 27, which at the time T7 causes it to send a pulse over each of the three AND gates $223_1$, $223_2$, $223_3$. Assuming that the executed microinstruction is one of the basic microprogram, and the flip-flop 221 of all three priorities are set, in the peripheral units 107 i.e., at least three interrupt requests of different priority are read to interrupt the basic microprogram, the three gates $223_1$, $223_2$ and $223_3$ generate each one a corresponding microinterrupt synchronization pulse to over each of the three lines 105 to the flip-flops 222 corresponding to the flip flops 221 already set on each peripheral unit 107 (FIG. 4). Thus each of the lines 105 acts to synchronize the microinterrupt requests on the corresponding one of the three priority levels. Each device $107_1$, $107_2$ and $107_3$ of the peripheral units 107 thus receives the signals for synchronizing the microinterrupts of priority levels.

Upon receipt of the synchronization pulses, the relevant flip-flops 222 of the device $107_1$, $107_2$, $107_3$, in each peripheral unit 107 wishing access to the central unit generate a corresponding microinterrupt signal $\mu$ $I_1$, $\mu$ $I_2$, $\mu$ $I_3$ over one of the three lines 109. Each of these lines transmits the relevant microinterrupt signal $\mu$ $I_1$, $\mu$ $I_2$, $\mu$ $I_3$ of one of the three priority levels. In the same manner as with the synchronization lines 105 each peripheral unit 107 is connected to lines 1, 2 and 3.

The lines 109 transmit the microinterrupt signals to the gates $225_1$, $225_2$ and $225_3$ of the microinterrupt controller 103. Of course in case one of the three flip-flops 221 is not set the relevant flip-flop 222 does not generate the corresponding microinterrupting signal. In case all the microinterrupt signals are present, gates $225_2$ and $225_3$ are disabled by signals $\overline{\mu I_1}$ and $\overline{\mu I_1}$, $\overline{\mu I_2}$ respectively whereas gate $225_1$ is enabled at an appropriate time not shown. In case one of the pair of microinterrupt signals $\mu I_1$ and $\mu I_2$, $\mu$ $I_1$ or $\mu$ $I_3$ are present, gates $225_2$ and $225_3$ are disabled by signal $\overline{\mu I_1}$. In case the pair of microinterrupt signals $\mu$ $I_2$ and $\mu$ $I_3$ are present, gate $225_1$ is disabled because of absence of signal $\mu I_1$, while gate $225_3$ is disabled by signal $\overline{\mu I_2}$, whereas gate $225_2$ is enabled by signal $\overline{\mu I_1}$. In case only the microinterrupt signal $\mu$ $I_3$ is present, the gate $225_1$ and $225_2$ are disabled by absence of the relevant microinterrupt signal, whereas the gate $225_3$ is enabled by the signals $\overline{\mu I_1}$ and $\overline{\mu I_2}$.

It is thus clear that the microinterrupt controller 103 decides which priority level microinterrupt is to be given access and sends an enabling voltage level over one of the three enabling lines 111.

This enabling level is sent to the relevant devices $107_1$, $107_2$ and $107_3$ of all the peripheral units 107, which can microinterrupt on that priority level and lasts for the whole time that the microinterrupt is being processed, since the microinterrupt signal lasts at the output of the relevant flip-flop 222.

In fact, as long as a level signal appears at the output of one of the gates $225_1$, $225_2$, $225_3$ the relevant gates $223_1$, $223_2$, $223_3$ remains disabled, whereby no further synchronizing pulse will be sent to the set flip-flop 222.

The enable logic 113 of a peripheral unit 107, a device of which has requested access to the central unit on the corresponding priority level, upon receipt of the enabling level by one of its gates $227_1$, $227_2$, $227_3$ sets its output 115 high. This allows the peripheral unit 107 to send through the AND gates 117, bus 119 and one of the set of conductors 102 an identifying 8-bit name code to the gates 123 (FIG. 2) of the central unit. The bus 119 is connected to the central unit through the interfacing circuitry 121, included in the controller 27. The interface circuitry 121 consists of pulse shaping and voltage level changing circuits which may be required to connect the various peripheral units to the central unit and are well known in the art. These circuits are no part of the invention, whereby they do not need to be described here. They are used to provide a mere interface between the central unit and the peripheral units 107. It needs contain no storage capacity for information but rather merely transmits it in the proper form. From a logical point of view the circuitry 121 may be replaced by more connectors provided on the unit 27 to connect the conductors coming out from the peripheral unit with the conductors coming out from the central unit.

In order to enable the microinterrupt controller 103 to give priority to only one of two or more devices $107_1$, $107_2$ or $107_3$, of the same level of priority, requesting interrupt, each peripehral unit 107 is provided with an OR gate 127 connected to another output of the enabling unit 113 and to a priority line 125, which is connected to a low level voltage and is passing through the various gates 127.

The priority line 125 is connected to each gate $227_1$, $227_2$ and $227_3$ of the logic 113 through an inverter 229.

Whenever a peripheral unit 107 which has requested access receives an enabling level, on the corresponding line 111, and the relevant gate $227_1$, $227_2$, $227_3$ is enabled by the line 125 through the relevant inverter 229, the output of the logic 113 is set to the gate OR 127 high for the whole time that the enabling level is present.

If two or more peripheral units 107 have requested access to the central unit at the same time and with a device having the same level microinterrupt, the low voltage through the priority line 125 causes the input of the AND gates 127 of all the peripheral units 107 further down the line 125 to go high. The enabling logic 113 of the peripheral units 107 further down the line 125 also receives this voltage level through the relevant inverters 229 and are prevented by it from setting their output 115 high. Thus the AND gates 117 are not enabled and the devices of these peripheral units 107 are prevented from sending their name code to the central unit.

By way of example, if both peripheral units 107 I and II send a level 1 microinterrupt at the same time to the central unit, the central unit sends an enabling voltage level to both peripheral units 107 over line 1 of lines 111. The peripheral unit I, however, sets its output to OR gate 127 high which sets the input from line 125 to the enabling logic 113 of peripheral unit II high and prevents it from sending its name code to the central unit. Thus only the peripheral unit I is able to send its name code and it receives access.

If peripheral unit II sends a microinterrupt of level 1 and peripheral unit I sends one of level 3, the microinterrupt controller 103 sends an enabling level only on line 1 of the lines 111 so that peripheral unit II is given access.

If the central unit is already processing a microinterrupt, the controller 103 sends synchronization pulses only over the lines 105 corresponding to higher priority level microinterrupts. In fact the gate $223_1$ is disabled only by the inverter connected to the output of the gate $225_1$, whereas the gate $223_2$ is disabled by either the inverter connected to output of the gate $225_1$ or the inverter connected to the gate $225_2$. Finally, the gate $223_3$ is disabled by any of the inverters connected to the three gates $225_1$, $225_2$ and $225_3$. Therefore each gate $223_1$, $223_2$ and $223_3$ is disabled upon the presence of the level at the output of the gates $225_1$, $225_2$ and $225_3$ connected thereto, whereby a microinterrupt microprogram may be interrupted only by a higher priority level microinterrupt. Thus, if it is processing a microinterrupt of level 2 it sends a synchronization pulse only over line 1 of lines 105.

The controller 103 also comprises a decoder 230, the inputs of which are connected to line 109. The decoder 230 has a pair of output connected to the command generating unit 21 to send to this latter a pair of bits EX and EK.

The reception of a microinterrupt $\mu$ $I_1$, $\mu$ $I_2$, $\mu$ $I_3$ by the microinterrupt controller 103 causes the decoder 230 to send the couple of bits EX and EK to the command generating unit 21, which causes it to generate a command to interrupt the performance of the main microprogram at the end of the execution of the microinstruction stored in the instruction register 17. The signals EX,EK also cause the command generating unit 21 to use the address stored in scratch pad memory registers $L_1$, $L_2$ or $L_3$ to address a microinterrupt microprogram in the read-only memory 15 depending on whether the microinterrupt is of level 1, 2 or 3, respectively. If, during the processing of one microinterrupt program, a second higher level microinterrupt is received over one of the lines 109, the microinterrupt controller 103 sends a second pair of bits EX, EK to the command generating unit 21 to interrupt the first microinterrupt microprogram at the end of the execution of microinstruction in the instruction register 17. In the same manner as above the level then causes the command generating unit 21 to use the address stored in the scratch pad memory register, corresponding to the priority level of the microinterrupt to address the read-only memory 15. After completion of the execution of the microprogram associated with a particular microinterrupt, the command generating unit 21 returns to the last interrupted microprogram associated with a lower priority level microinterrupt, if there is one, or to the main microprogram.

The various microinterrupt microprograms are so organized that at least one of microinstructions of a microinterrupt microprogram is a jump to the address in the read-only memory 15 located immediately before the first microinstruction of the microinterrupt microprogram. Normally said jump is the last microinstruction of the microinterrupt microprogram. In the location so addressed there is stored a microinstruction COM 0, which causes the command generating unit 21 to generate a command CF 00 signalling to the microinterrupt controller 103 that the microprogram is completed. Particularly the command CF00 enables one of the gates $224_1$, $224_2$, $224_3$ concomitantly with the output level signal of the corresponding gates $225_1$, $225_2$, $255_3$, which defined the executed priority microinterrupt, to restore the synchronizing pulse on the relevant line 105. This causes the flip-flop 222 to be reset and to stop the gates $225_1$, $225_2$, $225_3$ sending the associated microinterrupt voltage level to the enabling logic 113 of the operated peripheral unit 107 to the command generating unit 21. In turn, the command generating unit 21 starts the sensing of the request of microinstructions by generating the command CI01, thus causing the controller 103 to establish a new priority and the use of the register of the scratch pad memory 13 storing the address of the lower order microinterrupt microprogram or the main microprogram. Since, as explained above, the register of the scratch pad memory 13 being used to address the microinterrupt microprogram is incremented before the microinstruction is executed, the address of the first microinstruction of the microinterrupt microprogram is thereby restored in the proper register of the scratch pad memory 13.

The higher priority microinterrupt microprograms must be relatively short since they interrupt lower priority level microinterrupt microprograms. Thus, the higher priority microprograms may be used only for fairly simple operations, such as sending a character to the printer. The microinterrupt microprogram for the third priority level, however, may be longer and is used to perform more complicated functions such as preparing and checking a field of data to be sent to the printer or to magnetic tape.

The third priority level microinterrupt microprogram, is called the supervisory microprogram and is used by peripheral units 107 on both the single and the multiplex channels. It consists of a first common part which performs necessary preliminary operations and which ends with a jump to the one of a plurality of microprograms that corresponds to the particular device of the peripheral unit 107 or other source which initiated the microinterrupt.

The particular peripheral unit 107 which initiated the microinterrupt of the supervisor microprogram is identified by means of the name code, which as already mentioned, is sent through lines 119, the interface unit 121, gates 123 (FIG. 2C) and bus NA to a preselected register in the A portion 35 of the scratch pad memory 13. The name codes in conjunction with a "page" code in the corresponding B register may be used by the command generating unit 21 as an address to address a location in the read-only memory 15 which stores a jump instruction for jumping to the corresponding microinterrupt program associated with the specific peripheral unit.

Stored in the read-only memory 15 is a plurality of short level 1 microinterrupt microprograms each corresponding to a separate one of the peripheral units. In processing a microinterrupt of level 1, the command generating unit 21 uses another "page" code in the corresponding B register in conjunction with the name code A register to address the read-only memory 15. A microinstruction is stored in this location which causes the command generating unit 21 to transfer, to register A12, the address of the corresponding level 1 microinterrupt microprogram, which is contained in the Y and Z fields of the microinstruction. The register A12, is then used to address the read-only memory 15 in the manner stated above.

In the illustrated embodiment of invention there is only a single microprogram necessary to process microinterrupts of level 2. The address of this microprogram is stored in register A13.

The difference between the single and multiplex channel modes of operation depends on the handling of the corresponding microinterrupts by the microprograms in the read-only memory 15. Each series of microinterrupts requesting a single byte of information by a peripheral unit 107 connected to either lines 1 or 2 of lines 109 is preceded by a microinterrupt of level 3. This microinterrupt causes the address in the memory 11 of the field of information to be sent or received and the length of the transfer to be stored in the memory 11 or in the scratch pad memory 13, depending on whether the peripheral unit 107 is connected in the multiplex or single channel mode, respectively. In the case of the transmission of information to the peripheral unit 107, the field of information to be sent is also prepared in the memory 11.

The name code of the peripheral units 107 includes one bit for indicating whether the peripheral unit 107 is connected in the single or multiplex channel mode. If this bit is set, indicating a peripheral unit 107 connected in the single channel mode, the name code is stored in a first preselected A register of the scratch pad memory 13 and, if it is not set, the name code is stored in a second preselected A register.

The name code in the second preselected A register may be overwritten by the name code of a later level 3 microinterrupt from a peripheral unit 107 connected in the multiplex channel mode at any time after the processing of the first level 3 microinterrupt is completed. The name code in the first preselected A register is not erased until the entire set of subsequent level 1 microinterrupts is processed and, while it is there, prevents the control unit from processing any level 3 microinterrupts from peripheral units 107 having a name code indicating that they are connected in the single channel mode.

Each time the central unit receives one of the subsequent set of level 1 microinterrupts it increments the core memory address of the field involved in the transfer and decrements the length of the transfer. When the length reaches zero the command generating unit 21 causes the name code in the first preselected register to be erased and signals the control unit of the peripheral unit 107 that the transfer is finished. It is only after the name code is erased that the central unit will process later level 3 microinterrupts from peripheral units operating in the single channel mode.

Since there can only be one peripheral unit 107 communicating with the central unit at the time, the address and the length of the transfer can be stored in the scratch pad memory 13. In the multiplex channel, however, since several peripheral units can be sending interspersed level 2 microinterrupts, the address and the length of the transfer must be stored in the memory 11. This fact makes the data rate on the multiplex channel much slower since in the processing of each level two microinterrupt, the length and the address of the transfer must be transferred to the scratch pad memory 13 for being operated upon and then returned to the memory 11. The length and the address of the transfer are addressed in the memory 11 by means of the name code of the peripheral unit 107.

In processing microinterrupts of level 1 or 2 the command generating unit 21 generates a command causing a data synchronization pulse to be sent over line 129 via the interfacing unit 121 to the enabling unit 113 of the peripheral units 107. Particularly a gate 231 is enabled by this pulse on the line 129 concomitantly with the signal and the output 115 to tell the peripheral unit 107 which has access to send or to be ready to receive a byte of data. Immediately thereafter the peripheral units 107 send or receive the byte of data over the lines 131 which through a gate 232 is now enabled by the output of the gate 231, and is connected through the gate 99 (FIG. 2c) to the memory 11.

If the transfer of information between a peripheral unit 107 and the central unit takes place pursuant to a program instruction rather than a request for access by a peripheral unit 107, the central unit initially selects the peripheral unit 107 by sending the corresponding name code over lines 131 under the control of a command generated by the command generating unit 21. In this way a predetermined peripheral unit 107 is conditioned for connection with the central unit as is conventional in the art. The central unit then uses the supervisory microprogram which is selected by sending a level 3 microinterrupt to the microinterrupt controller 103 over line 133. To this end the controller 103 is provided with a pair of flip-flops 233 and 234 similar to the flip-flops 221 and 222. The flip-flop 233 is now set by the signal over the line 133, while the flip-flop 234 is connected to line 105/3 and is synchronized by the output of the gate 223$_3$. The output of the flip-flop 234 is able to emit the microinterrupt signal $\mu$I$_3$ on the line 109/3, whereby the microinterruption generated by the central unit on priority level 3 will be handled by the controller 103 in a manner similar to the other level 3 microinterrupt. The level 1 or level 2 microinterrupt microprograms are now used to control the transfer of data.

Besides the microinterrupts concerning the peripheral units, there are also other which may originate from the operator's console (not shown) over line 135 or from the memory 11 over line 137. Both lines 135 and 137 are connected to a circuit similar to that energized by the line 133, whereby a signal over them is adapted to cause the generation of an interrupt signal of level 3 and are interpreted and processed by the microinterrupt controller 103 in the same manner as the microinterrupts previously discussed. It is to be noted that in the case where more than one interrupt of level 3 appears simultaneously on the controller 103 because of signals on lines 133, 135, 137, the microinterrupt to be first executed depends on the location of the relevant circuit from the left to the right in a manner similar to that of the peripheral units 107. To this end the line 125 is connected to a gate 245 having a function similar to that of the gates 127. In other words the interruption generated by the memory 11 (line 137) has priority on that generated by the console (line 135) which has priority on that generated by the central unit (line 133), which has priority on the various peripheral units 107.

The microinterrupts originating from the operator's console may be caused by the action of the operator in actuating control keys. Those originating from the memory 11 may, for instance, intervene when an overflow of memory 11 occurs, or when a parity check error is detected. In the last case, the execution of the second microinstruction is delayed until the memory cycle initiated by the first microinstruction is completed.

Summarizing, during the execution of the microprograms and in particular at the end of the execution of each microinstruction the controller 27 senses the microinterruption requests for a priority higher than that of the microprogram in process of execution. If none is present, the microprogram continues. Possible requests of equal or lower priority remain pending, stored in the units which have generated them.

If at least one request of higher priority is present, on the other hand, the microprogram corresponding to the request of higher priority is activated. The microprogram being previously executed remains suspended until the microinterruption which has a higher priority has been fully processed.

The required operations having been completed, the activated microprogram cancels the microinterruption request which has been met and deactivates itself, emitting a suitable microinstruction (COM 0); at this, the controller 27 senses again the possible presence of pending requests of the same priority, in addition to continuing the examination of those of lower level. If there is no request, execution of the suspended microprogram resumes; if there is one, this is met; if there are more than one, that of highest priority is chosen from among all of them, the others being left pending. It may happen that several microinterruptions of equal priority present themselves at the same time; when it becomes possible to meet one of them, the choice is made in a fixed order of priority.

Among the peripheral units which may be connected into the system in the multiplex channel mode is a parallel-serial printer shown schematically in FIG. 5 of the drawings. The printer includes 8 type wheels 87 (shown in more detail in FIG. 6) each of which carries on its periphery, in the illustrated embodiment, 48 type characters. These characters may include the letters of the alphabet, the numerals from 0 through 9, and whatever other characters are necessary for a particular application.

The type wheels 87 all rotate in synchronism so that the same characters are brought into the printing position simultaneously on all of them. Eight printing hammers 89 are provided, one for each wheel 87, and the hammers 89 may be activated selectively by means of individual electromagnets 91. The record member 93 to be printer upon, which may be either an individual form or a continuous paper web, is disposed between the hammers 89 and the type wheels 87. An inking ribbon 95 is disposed between the record number 93 and the type wheels 87.

The eight type wheels 87 are spaced so as to print in every 16th character place of a line. The housing 97, on which the printing wheels 87, hammers 89 and electromagnets 91 are mounted, moves in a continuous manner across the page, first in one direction and then in the other at a speed which allows all 48 characters to pass through the printing position while the type wheel 87 is in position for printing in a single character place on the paper 93. The movement continues until each wheel 87 has printed 16 character places and the 128 character line of printing is completed. On the return movement of the housing 97 the type wheels 87 print the next line backwards.

The synchronism signals for the printing of the characters are supplied by two series of holes 186, 187, formed in a disc 190 movable in synchronism with the wheels 87. The arrangement of these holes 186 and 187 is in correspondence of the characters of the wheels 87. The synchronism signals are generated by the holes 186 and 187 in co-operation with a pair of phototransistors 191 and 192 and a lamp 196. The phototransistors 191 and 192 are connected by means of the pairs of wires 145 to a printer control unit, generically indicated by numeral 143 in FIG. 7. The printing control unit 143 includes the same circuitry of any peripheral unit 107 already described, whereby in FIG. 7 only the relevant connections 105, 109, 111, 119, 125 and 129 are indicated. The holes 186 and 187 refer respectively to the cases of alphanumeric characters with the carriage moving from left to right and from right to left respectively.

In the disc 190 there is moreover formed a pair of holes 188 and 189 arranged in such manner as to pass in front of a pair of phototransistors 193 and 194 and another lamp 195 when the beginning of the blank space 287 comes into correspondence with the printing zone. The phototransistors 193 and 194 also are connected to the central control unit by means of a pair of wires 147. To simplify the drawing the holes 188 and 189 are indicated in FIG. 5 as located in the same radial direction. In effect they are off-set according to the two opposite ends of the blank space 287.

Figure 7:
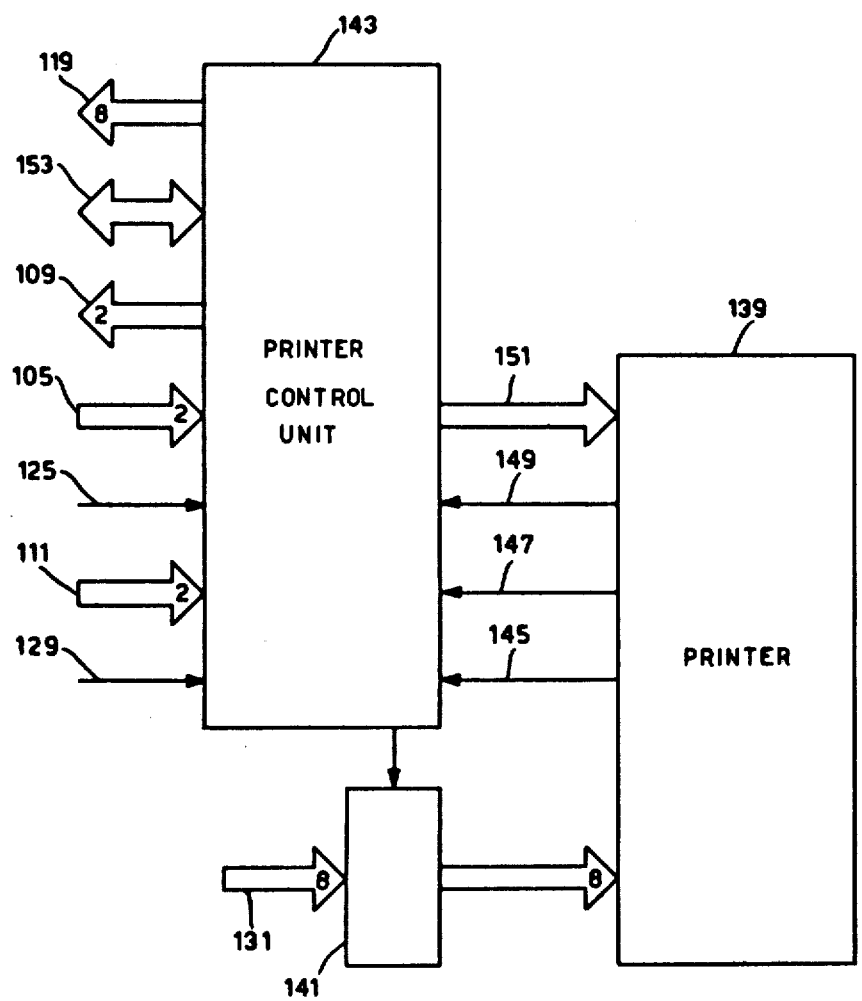
FIG. 7 is a block diagram of the control unit of the printer of FIG. 5.

The wheels 87, hammer 89, electromagnets 91, disk 190, and the phototransistors 191, 192, 193 and 194 are included in a mechanical device or part of the printer which is generically indicated by the numeral 139 in FIG. 7.

A more detailed description of the structure and operation of a printer of the type described in relation to this embodiment of the invention, may be found in U.S. Pat. No. 3,675,753 which is assigned to the assignee of the present invention.

Initially, the 128 characters of a line to be printed are stored in a selected 128 byte field in the memory 11. This field is prepared by the supervisory microprogram which unpacks the two characters per byte binary decimal coded numerical information into a one character per byte code and prepares it in the field in the format in which it is to be printed. The characters may be coded in any desired code, for instance the eight-bit ISO code. The characters to be printed during a particular cycle of the type wheels 87 are transcoded from the 128 byte field into a predetermined 48 byte field in a service area of the memory 11. The 48 bytes within this field correspond to the 48 characters on a type wheel 87 and the 8 bits of each byte correspond to the 8 type wheels 87. Thus, if the characters are arranged alphabetically on the type wheel 87, as shown in FIG. 6 with "A" the first character, and the first character in the 128 byte fields is a "C", a binary bit is recorded in the first bit place of the third byte of the 48 byte field. A binary bit is also recorded in the second bit place of the byte of the 48 byte field corresponding to the 17th character of the 128 byte field and in the third bit place of the byte corresponding to the 33rd character of the 128 byte field and so on until the character to be printed by each type wheel 87 is specified. If no character is to be printed by a particular wheel 87, no binary bit is recorded in the corresponding bit place of the bytes of the 48 byte field.

The type wheels 87 each have a blank space 287 on their periphery between the 48th and the 1st character. This blank space allows time for the computer to prepare in the 48 byte field the next 8 characters to be printed. The encoding takes only a fraction of the time necessary for the blank space 287 to pass. As the characters on the type wheels 87 pass in front of the hammer 89 the corresponding byte of the 48 byte field is sent via the controller 27 to the printer for controlling the operation of the hammers 89.

In this manner much of the logic and control circuitry necessary to translate the data sent by the central unit into a form usable to control the printer are eliminated. The central unit of the computer sends the actual commands for firing the individual printing hammers 89 to the printer.

The transcoding of information from a selected 128 byte field in the memory 11 (FIG. 2) to a predetermined 48 byte field in the memory 11 is accomplished by means of the supervisory microprogram which, as mentioned hereinbefore, is the third priority level microinterrupt microprogram. The supervisory microprogram uses the code of the character to be transcoded as an address for the read-only memory 15. In the read-only memory 15 location corresponding to a particular character code there is stored the address, in the memory 11, of the byte of the 48 byte field which corresponds to the particular character. This address is transferred to the scratch pad memory 13 for use in addressing the memory 11.

Using this address the corresponding byte of the 48 byte field is transferred to the scratch pad memory 13 and from there to the indicator register 63 (FIG. 2b). A bit is then recorded in the indicator register 63 at the location corresponding to the type wheel 87 which is to print the character being transcoded. This bit is recorded by means of gates 64 at the location determined by commands CD15, CD16 and CD17. The contents of the indicator register 63 are next transferred to the scratch pad memory 13 and from there to the same location in the 48-byte field as it was previously.

Following this 16 is added to the address of the 128 byte field and the transcoding of the character to be printed by the next type wheel to the next bit place within the corresponding byte of the 48 byte field is accomplished. The transcoding is repeated until the characters to be printed by all 8 type wheels during their next rotation are transcoded. The transcoding of 8 characters to the 48 byte field is repeated once for each rotation of the type wheels 87 (FIG. 5) until the wheels 87 have each printed 16 characters and the 128 character line is completed.

After each transcoding of a set of 8 characters the number 111 is subtracted from or added to the address of the 128 byte field so that the transcoding of the next set of 8 characters starts from one character place to the right or left of the previous set, depending on which way the printing carriage is moving.

The system used in the illustrated embodiment of the invention for transcoding a set of 8 characters was chosen in order to minimize the time during which the central unit is occupied in the transcoding. In using this system the transcoding must be completed while the blank space is passing in front of the hammer 89. Thus printing cannot begin until after the entire 8 characters are transcoded.

Another system which would require more central unit time but would allow the printing to begin while the transcoding is taking place is to search the 8 characters of the 128 byte field to be transcoded for A's and then for B's, etc. In this way the transcoding could take place while the characters bearing portion of the type wheels 87 are passing before the printing hammers 89.

Referring to FIG. 7 the electromagnets 91 of mechanical part 139 of the printer are operated, in a known manner, under the control of the successive sets of 8 bits which are stored by a one byte buffer register 141 while the corresponding character is passing through the printing position. The buffer register 141 receives the successive bytes from the central unit over lines 131 as any other data exchanged between the peripheral units 107 and the central units.

The phototransistors 191, or 192 (FIG. 5) of the mechanical part 139 signals the printer control unit 143 (FIG. 7) over line 145 each time a new character comes into printing position. Line 145 is connected to the relevant flip-flop 221 (FIG. 4) of level 2, whereby this signal causes the control unit 143 (FIG. 7) to send a level 2 microinterrupt to the microinterrupt controller 103 over one of lines 109 the next time it receives synchronization pulses over lines 105. When the control unit 143 receives the data synchronization pulse over line 129 it enables the buffer register 141 to receive the byte over lines 131.

The control unit 143 receives a signal from the phototransistor 193 or 194 (FIG. 5) of the mechanical part 139 over line 147 (FIG. 7) when the blank space on the type wheel 87 begins to pass through the printing position. Line 147 is connected to the relevant flip-flop 221 (FIG. 4) of level 3, whereby this signal causes a level 3 microinterrupt to be sent to the central unit for causing it to transcode the next set of characters into the 48 byte field. Over line 149 the control unit receives end-of-paper signals and other control signals from the mechanical part 139, which signals are generated in a manner known per se. The lines 151 are used for sending control signals for the paper feed and carriage controls, which are included in the mechanical part 139 and the lines 153 are used for sending to and receiving from the central unit various control signals for the printer.

The computer of the invention described hereinabove may also take the form of other embodiments. Among these other embodiments is one which is more suitable for a small scale desk-top version of the computer. In this embodiment the computer works on 4 bit bytes instead of the 8 bit bytes of the above described embodiment. In keeping with its smaller scale, the memory 11, the read-only memory 15 and the scratch pad memory 13 all have a smaller capacity than those of the illustrated embodiment. The scratch pad memory 13 in particular may be constituted by a single set of 16, 12 bit registers instead of two 16 register portions. Four bit portions of a register may be addressed individually.

Besides the general reduction in the complexity of the logic, one feature of this smaller scale embodiment which is notable is the capability of transferring a constant stored in the read-only memory 15 directly from the microinstruction register 17 to the arithmetic and logical unit 25 for use in an operation. In the illustrated embodiment it would be necessary to first transfer the consant from the microinstruction register 17 to the scratch pad memory 13 before using it in an arithmetic operation.

What we claim is:

1. A desk-top electronic computer system having a central processing unit for executing a program comprising a series of instructions, said system having at least one peripheral unit, said central processing unit including:
   a memory for storing microprograms made up of a predetermined set of microinstructions which correspond to selected program instructions, at least one microprogram being provided for operation of each peripheral unit,
   means for storing a microinstruction read out from said memory,
   command generating logic controlled by said means for storing generating executing commands for each of said stored microinstructions,
   interface control means interconnecting said central processing unit and said peripheral units,
   each peripheral unit including a plurality of devices, each of said devices being conditionable by said interface control means for generating a request for access to said central processing unit, each of the requests for access generated by the plurality of devices of each peripheral unit having assigned thereto one of a plurality of different priority levels.
   said interface control means comprising:
   analyzing means responsive to the requests for access of different priority levels to generate an interrupt signal corresponding to the request for access of the highest priority level, and
   interrupt control means cooperating with each peripheral unit and responsive to the interrupt signal generated by said analyzing means for enabling the microprogram for the peripheral unit including the device assigned to the highest priority level.

2. The computer system of claim 1 including a plurality of peripheral units, unidirectional means connecting said peripheral units, each of said peripheral units including means coupled to said unidirectional connecting means and responsive to the reception of an enabling voltage from said interrupt control means, when one of its devices has requested access, for generating a disabling voltage to the devices of the same priority level in the peripheral units downstream from it in said chain and means responsive to the reception of a disabling voltage from a device of the same priority level of a peripheral unit unidirectionally connected to it upstream in said chain for preventing said receiving peripheral unit from communicating with said central processing unit.

3. The computer system of claim 1 including a plurality of peripheral units, means unidirectionally connecting in chain said peripheral units including means responsive to the reception of an enabling voltage from said interrupt control means, corresponding to the priority level of its device which has requested access, for generating a disenabling voltage to the devices of the same priority level in the peripheral units downstream from it in said claim for preventing said same level devices from communicating with said central processing unit.

4. The computer system of claim 1 wherein said peripheral units include means responsive to the reception of an enabling voltage when it has requested access for sending an identifying name code to said central processing unit.

5. A desk-top electronic computer system as claimed in claim 1, further including means for generating synchronizing signal synchronizing the access request of the peripheral units, wherein said disabling means are controlled by said highest priority level interrupt to prevent the generation of synchronization signals directed to the lower priority peripherals.

6. A desk-top electronic computer system as claimed in claim 1, wherein said analyzing means include:
   a priority network for selecting a signal among a plurality of access request signals,
   a decoder responsive to said selected access request signal for conditioning said command generating logic to generate a corresponding microprogram interrupt command, and
   a scratch pad memory storing a plurality of interrupt microprogram addresses for addressing said microprogram storing memory, said microprogram interrupt command being effective to locate in said scratch pad memory the address of the relevant interrupt microprogram to be performed.

7. A desk-top electronic computer system including
   a central processor for executing a program comprising a series of instructions, said system having a plurality of peripheral units, said central processor including
   a memory for storing microprograms, at least one microprogram being provided for operation of each of said peripheral units
   each of said peripheral units including devices for transmitting a plurality request for access to said central processor, said requests being organized on a plurality of priority levels,
   analysing means responsive to the highest priority level request for generating a single interrupt signal corresponding thereto,
   interrupt control means responsive to the single signal from said analysing means and the priority requests from said peripheral units for enabling the peripheral unit sending the highest priority interrupt to transmit its address to the central processor,
   unidirectional means connecting said peripheral units into a unidirectional chain, each of said peripheral units including means coupled to said unidirectional connecting means and responsive to the reception of an enabling voltage from said interrupt control means when one of its devices has requested access, for generating a disabling voltage to the devices of the same priority level in the peripheral units downstream from it in said chain and means responsive to the reception of a disabling voltage from a device of the same priority level of a peripheral unit unidirectionally connected to it upstream in said chain for preventing said receiving peripheral unit from communicating with said central processor.

8. A system as claimed in claim 7 wherein each of said peripheral units includes a plurality of devices, each of said devices transmitting one of said priority requests on one of said levels.

said interrupt control means being responsive to the priority level request from one of said devices for transmitting the disabling voltage to the interrupt control means cooperating with the other peripheral units to prevent devices of the same priority level in said other peripheral units from communicating with the central processor.

* * * * *